US00RE47370E

(19) United States
(12) Reissued Patent
Park et al.

(10) Patent Number: US RE47,370 E
(45) Date of Reissued Patent: *Apr. 30, 2019

(54) OPTICAL IMAGING SYSTEM

(71) Applicant: SAMSUNG ELECTRONICS CO., LTD., Suwon-si, Gyeonggi-do (KR)

(72) Inventors: Seong-Ha Park, Yongin-si (KR); Ki-Tae Kim, Seongnam-si (KR)

(73) Assignee: Samsung Electronics Co., Ltd., Suwon-si (KR)

( * ) Notice: This patent is subject to a terminal disclaimer.

(21) Appl. No.: 15/379,852

(22) Filed: Dec. 15, 2016

Related U.S. Patent Documents

Reissue of:

(64) Patent No.: 7,466,497
Issued: Dec. 16, 2008
Appl. No.: 11/473,154
Filed: Jun. 21, 2006

U.S. Applications:

(60) Continuation of application No. 14/153,566, filed on Jan. 13, 2014, now Pat. No. Re. 46,262, which is an application for the reissue of Pat. No. 7,466,497, said application No. 14/153,566 is a division of application No. 12/970,720, filed on Dec. 16, 2010, now Pat. No. Re. 44,773, which is an application for the reissue of Pat. No. 7,466,497.

(30) Foreign Application Priority Data

Jul. 7, 2005 (KR) ..... 10-2005-0061174

(51) Int. Cl.

| | |
|---|---|
| ***G02B 9/34*** | (2006.01) |
| ***G02B 3/02*** | (2006.01) |
| ***G02B 5/20*** | (2006.01) |
| ***G02B 13/00*** | (2006.01) |
| ***G02B 9/36*** | (2006.01) |

(52) U.S. Cl.
CPC ..... *G02B 13/004* (2013.01); *G02B 9/34* (2013.01); *G02B 9/36* (2013.01)

(58) Field of Classification Search
CPC ..... G02B 9/34; G02B 9/36; G02B 13/004
USPC ..... 359/715, 771, 772, 773, 779
See application file for complete search history.

(56) References Cited

U.S. PATENT DOCUMENTS

| | | | | |
|---|---|---|---|---|
| 4,095,873 | A * | 6/1978 | Takahiro | 359/723 |
| 5,050,973 | A | 9/1991 | Sakamoto | |
| 5,859,729 | A | 1/1999 | Misaka | 359/686 |
| 6,236,522 | B1 | 5/2001 | Shimizu | |

(Continued)

FOREIGN PATENT DOCUMENTS

| | | |
|---|---|---|
| CN | 1627118 | 6/2005 |
| JP | 2005-1027 | 1/2002 |
| JP | 2005-004027 A | 1/2005 |

OTHER PUBLICATIONS

Hecht, Eugene. Optics, Fourth Edition, Addison Wesley, San Francisco, CA, U.S.A., 2002, pp. 243-246.*

(Continued)

*Primary Examiner* — Christina Y. Leung
(74) *Attorney, Agent, or Firm* — Jefferson IP Law, LLP

(57) ABSTRACT

An optical imaging system is provided comprising a first lens group having a positive refractive power; a second lens group having a negative refractive power; a third lens group having a positive or negative power; and a fourth lens group having a positive or negative power.

20 Claims, 14 Drawing Sheets

(56) References Cited

U.S. PATENT DOCUMENTS

| | | | | |
|---|---|---|---|---|
| 6,288,850 | B1 * | 9/2001 | Otomo | 359/773 |
| 6,898,030 | B1 | 5/2005 | Lin et al. | |
| 7,190,532 | B2 * | 3/2007 | Amanai | 359/781 |
| 7,206,143 | B2 | 4/2007 | Kamo et al. | |
| RE46,735 | E * | 2/2018 | Park | G02B 9/34 |
| 2004/0012861 | A1 | 1/2004 | Yamaguchi | |
| 2004/0027685 | A1 | 2/2004 | Mihara et al. | |
| 2004/0136097 | A1 | 7/2004 | Park | |
| 2004/0218285 | A1 | 11/2004 | Amanai | |
| 2004/0228009 | A1 | 11/2004 | Kamo et al. | |
| 2005/0024748 | A1 | 2/2005 | Amanai | |
| 2005/0105194 | A1 | 5/2005 | Matsui et al. | |
| 2005/0117047 | A1 * | 6/2005 | Isono | 348/335 |
| 2006/0056068 | A1 * | 3/2006 | Lee et al. | 359/781 |

OTHER PUBLICATIONS

Office Action issued in related application KR 10-2005-0061174, Aug. 30, 2006, with English language translation, 5 pages.

Park, Young-Woo; Patent Application Publication No. US 2004/0136097 A1; Publication Date: Jul. 15, 2004; "Photographing Lens;" . . . .

* cited by examiner

OPTICAL IMAGING SYSTEM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

[CLAIM OF PRIORITY] *CROSS-REFERENCE TO RELATED APPLICATIONS*

*Notice: More than one reissue application has been filed for the reissue of U.S. Pat. No. 7,466,497. The reissue applications are application Ser. No. 12/970,720 (a reissue application of U.S. Pat. No. 7,466,497, reissued as RE44,773), Ser. No. 14/153,566 (a divisional reissue of Ser. No. 12/970,720, reissued as RE46,262), Ser. No. 14/153,710 (a continuation reissue of Ser. No. 12/970,720), and Ser. No. 15/379,852 (this application, a continuation reissue application of Ser. No. 14/153,566), all of which are reissues of U.S. Pat. No. 7,466,497.*

*This application is a continuation reissue application of U.S. patent application Ser. No. 14/153,566, filed Jan. 13, 2014 and reissued as RE46,262, which is a divisional reissue application of U.S. patent application Ser. No. 12/970,720, filed Dec. 16, 2010 and reissued as RE44,773, which is an application for reissue of U.S. Pat. No. 7,466,497, the contents of which are incorporated herein by reference.*

This application claims priority to an application entitled "Optical Imaging System," filed with the Korean Intellectual Property Office on Jul. 7, 2005 and assigned Serial No. 2005-61174, the contents of which are incorporated herein by reference.

BACKGROUND [OF THE INVENTION]

1. Field of the Invention

The present invention generally relates to an optical system, and more particularly to an optical system including multiple lens groups having a reduced volume.

2. Description of the Related Art

An optical imaging system includes imaging elements such as CCD imaging elements (charged coupled devices) or CMOS imaging elements (complimentary metal oxide semiconductors) and at least one lens group for use in various types of consumer products such as digital and monitoring cameras, personal computers, and the like.

The lens group typically includes at least one lens having undesirable aberration characteristics. These undesirable aberration characteristics are intrinsic to the lens and are generated due to the shape of the lens. The aberration characteristics can cause distortion of images in certain circumstances. Among the different type of aberrations, the spherical and coma aberrations, in particular, cannot be easily corrected and can cause image flares and other undesirable visual effects.

In order to solve problems caused by such lens aberrations, it has been previously proposed in the prior art to utilize a lens group including an aspheric lens for correcting the aberrations, or a thin film filter or an optical filter having a sharp surface which can restrict a portion of the light.

Further, recent developments in image devices for miniaturization and portability, for use in miniaturized optical imaging systems require mounting in the image devices.

Therefore, it would be desirable to have an improved optical imaging system that is miniaturized and whose optical characteristics exhibit minimal deterioration over time.

SUMMARY [OF THE INVENTION]

Accordingly, the present invention has been made in view of the above-mentioned problems involved with the related art by providing an optical imaging system having a reduced volume and whose optical characteristics exhibit minimal deterioration over time.

One aspect of the present invention is to provide an optical imaging system including: a first lens group having a positive refractive power; a second lens group having a negative refractive power; a third lens group having a positive or negative power; and a fourth lens group having a positive or negative power.

DETAILED DESCRIPTION

Hereinafter, embodiments of the present invention will be described with reference to the accompanying drawings. In the following description of the present invention, a detailed description of known functions and configurations incorporated herein is omitted to avoid making the subject matter of the present invention unclear.

Figure 1:
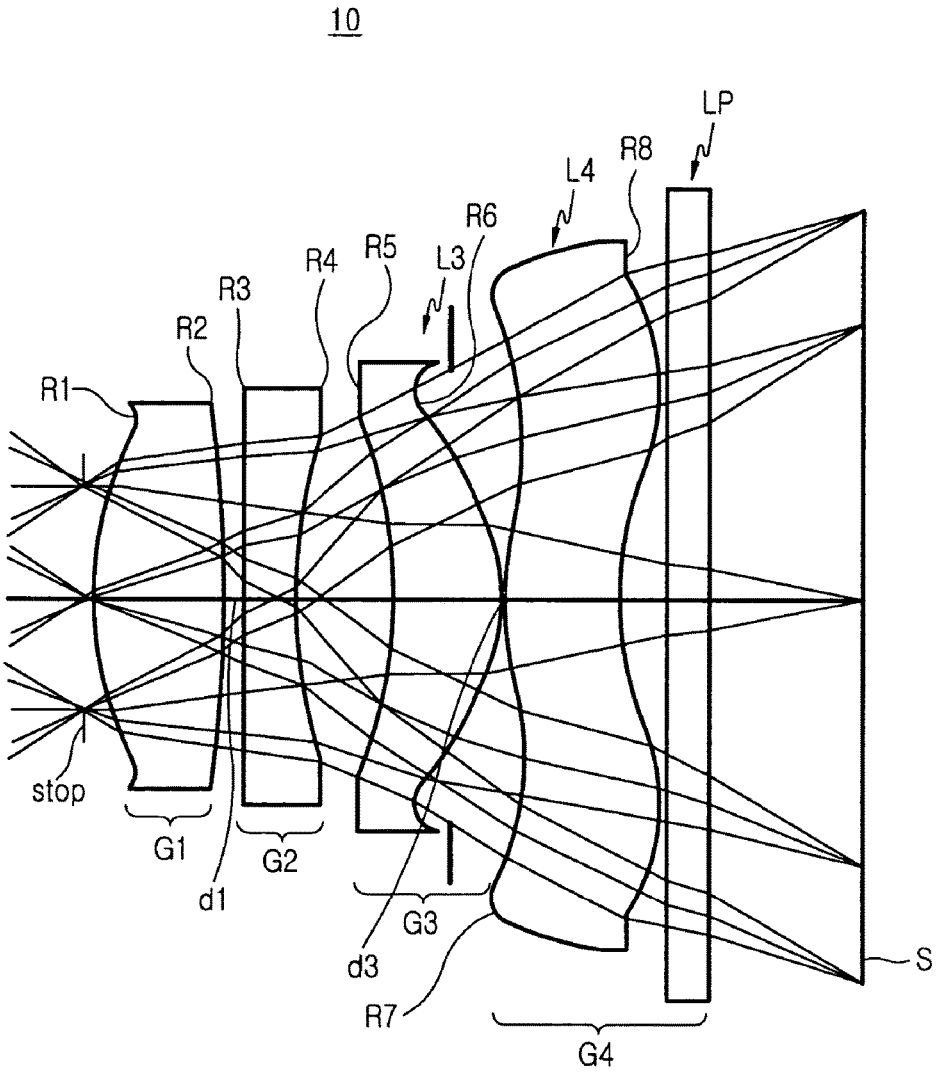
FIGS. 1 to 14 are views illustrating optical imaging systems according to particular embodiments of the present invention.
Figure 2:
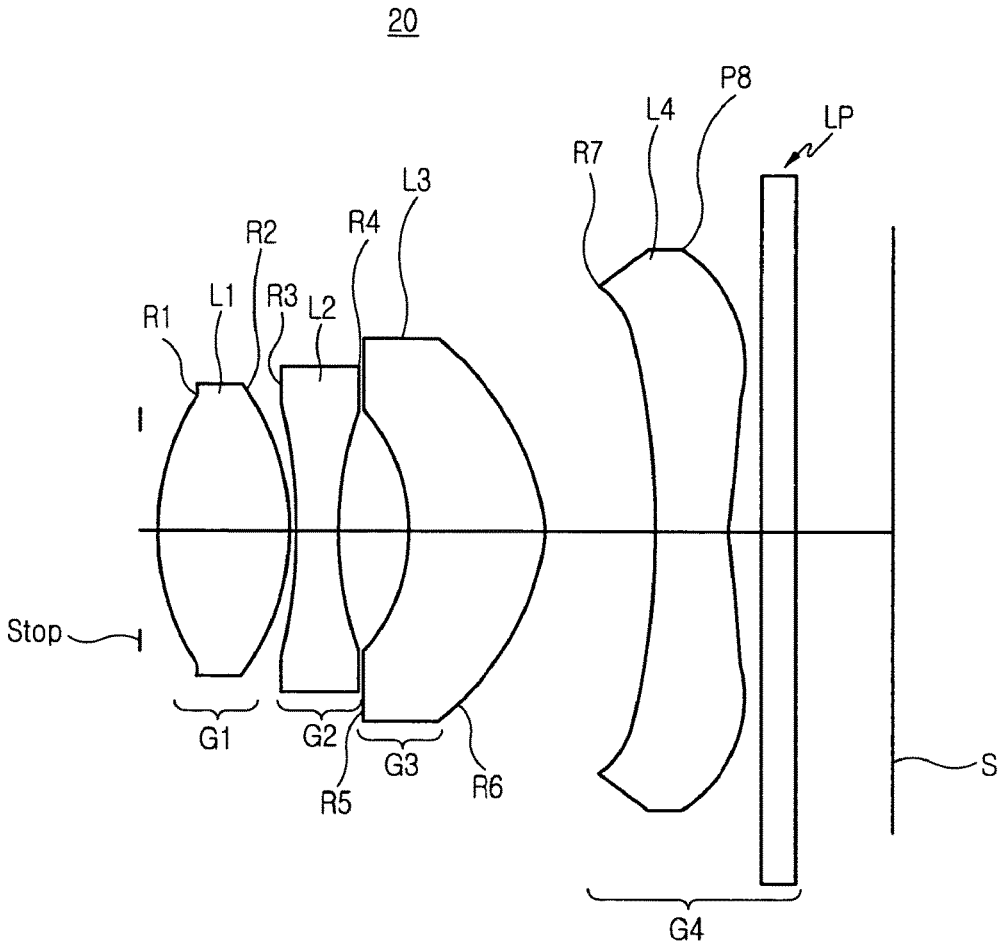
Figure 3:
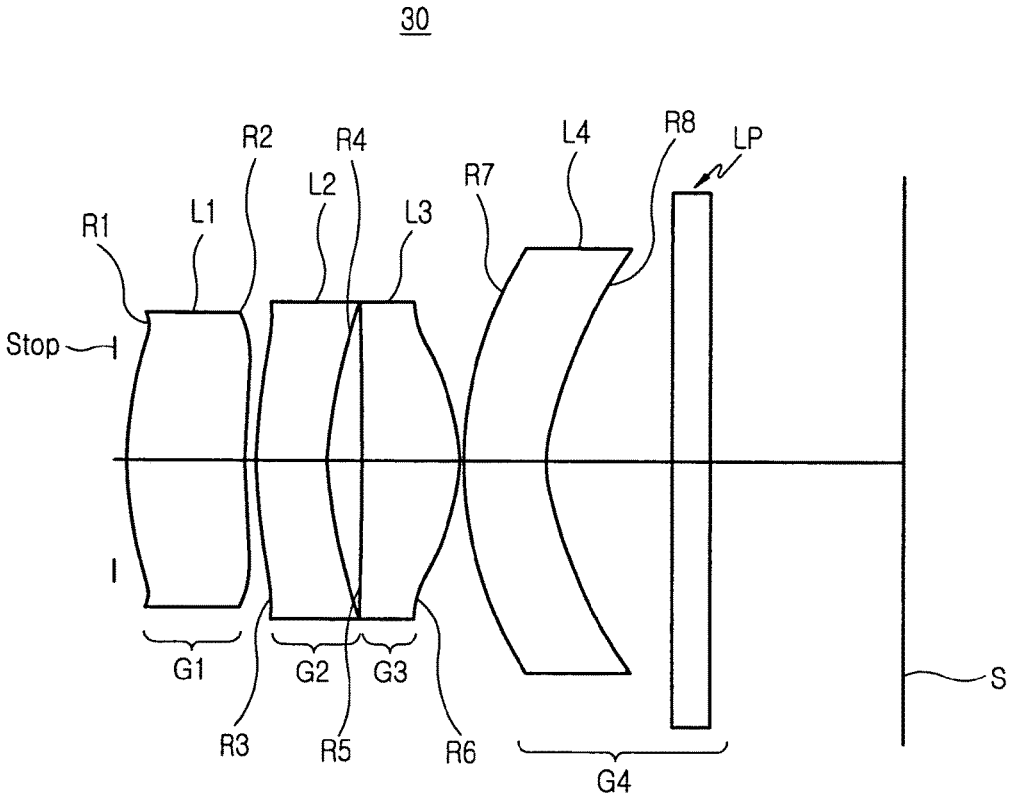
Figure 4:
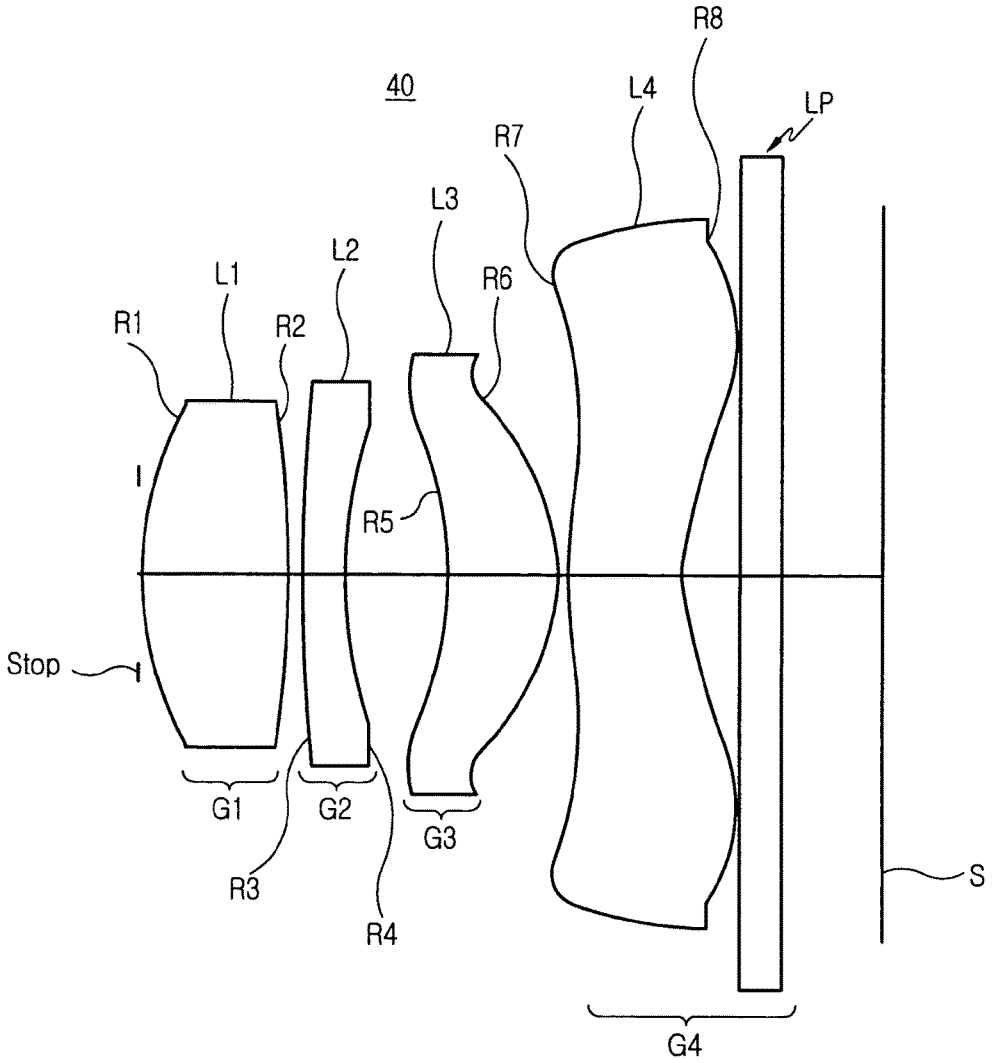
Figure 5:
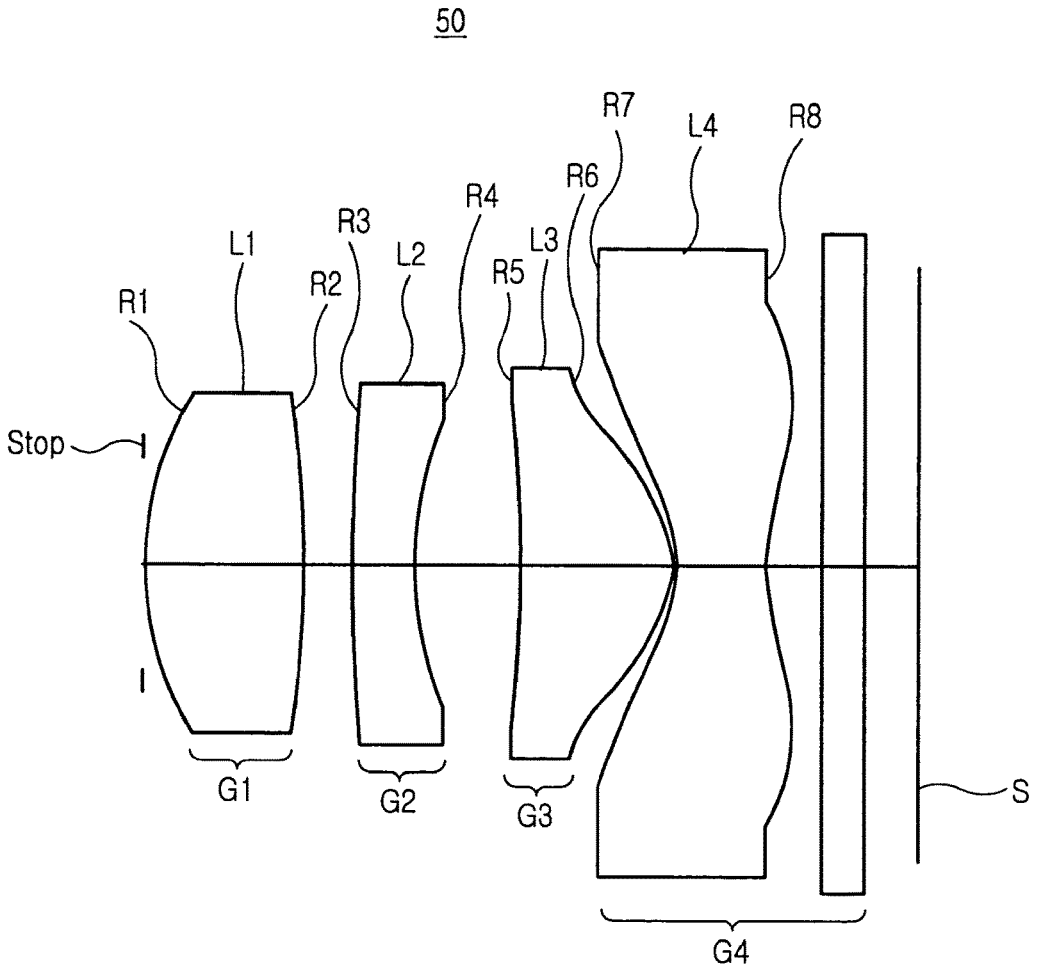
Figure 6:
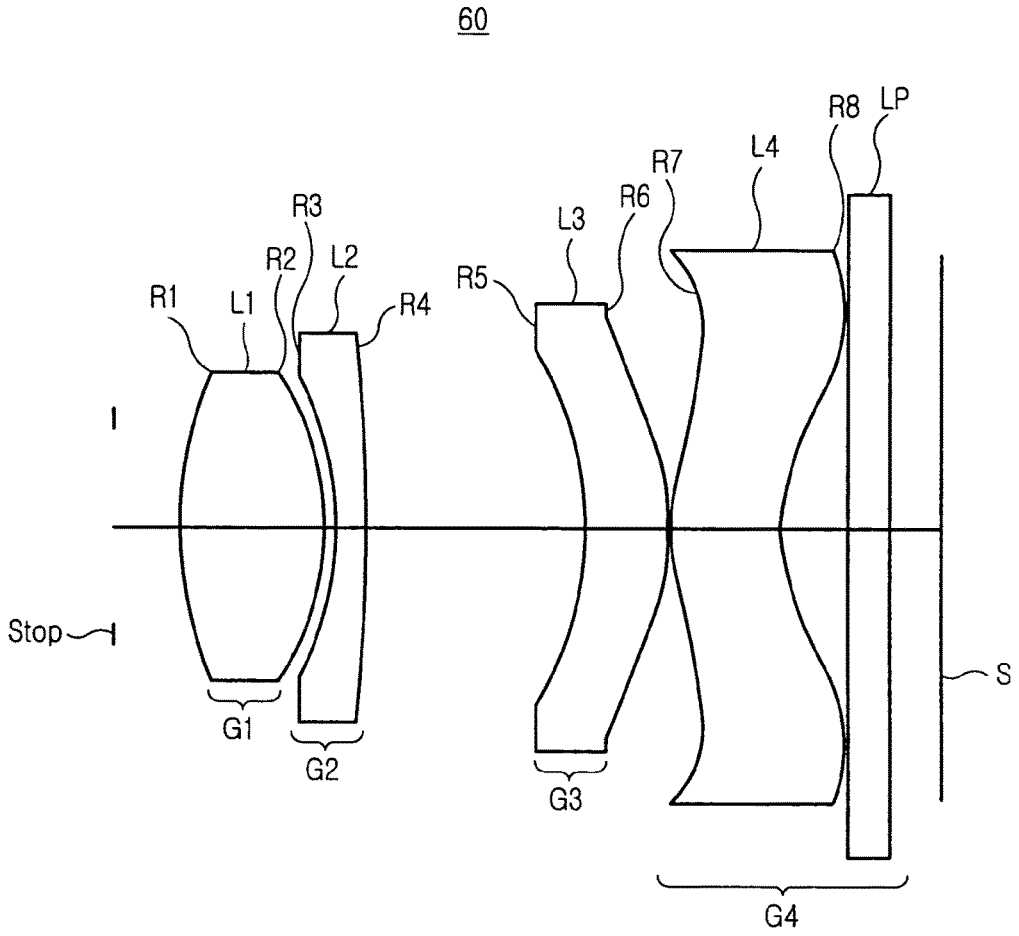
Figure 7:
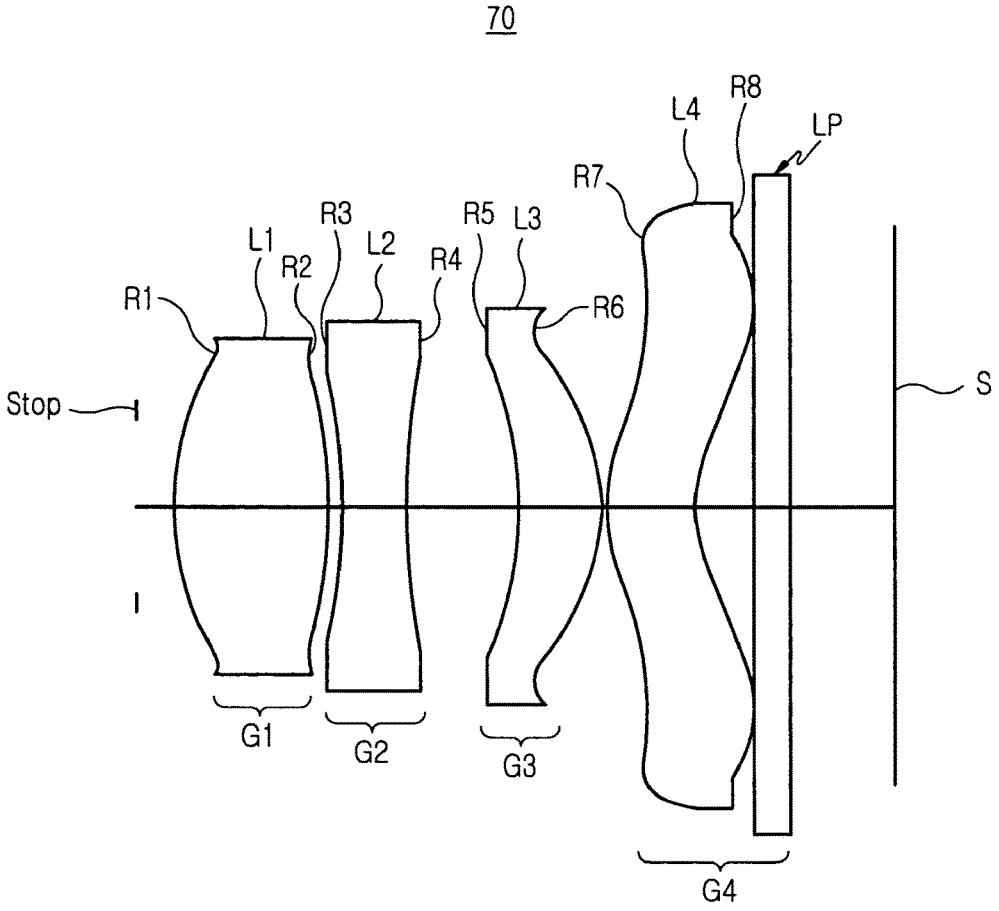
Figure 8:
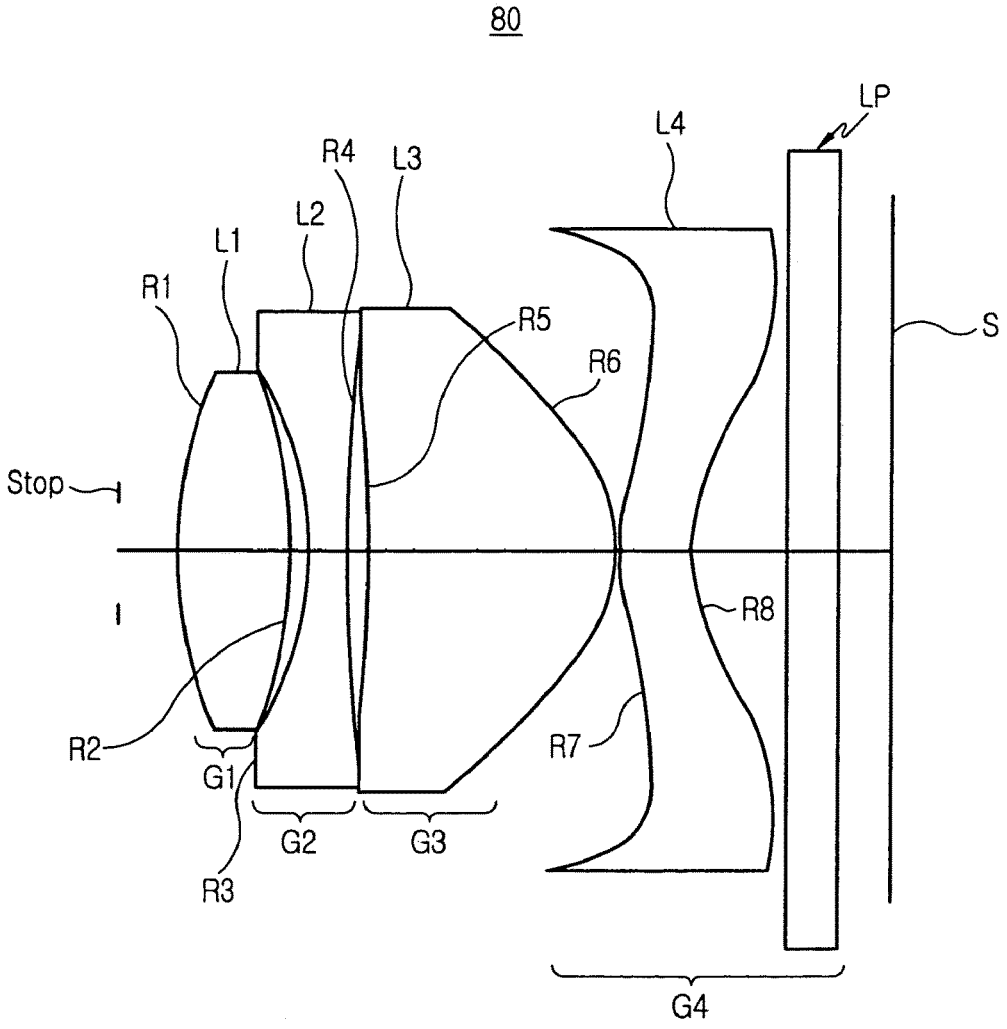
Figure 9:
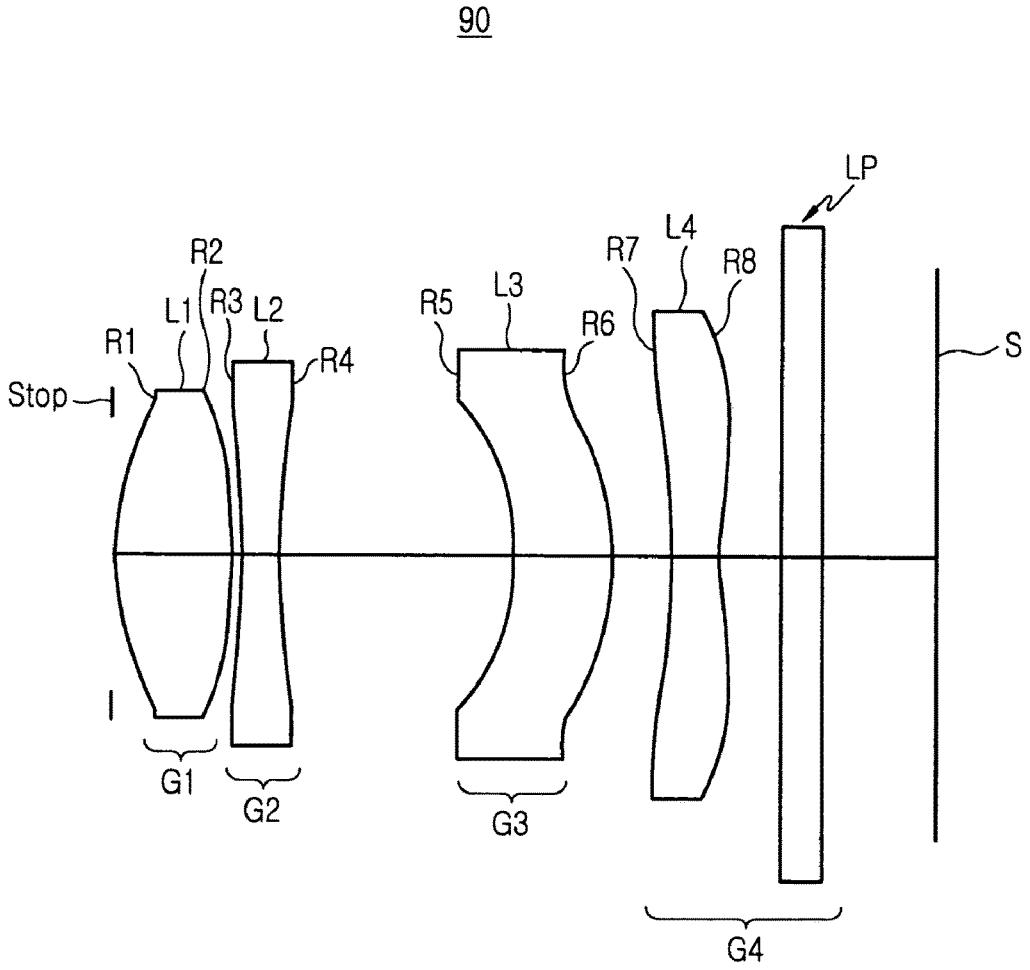
Figure 10:
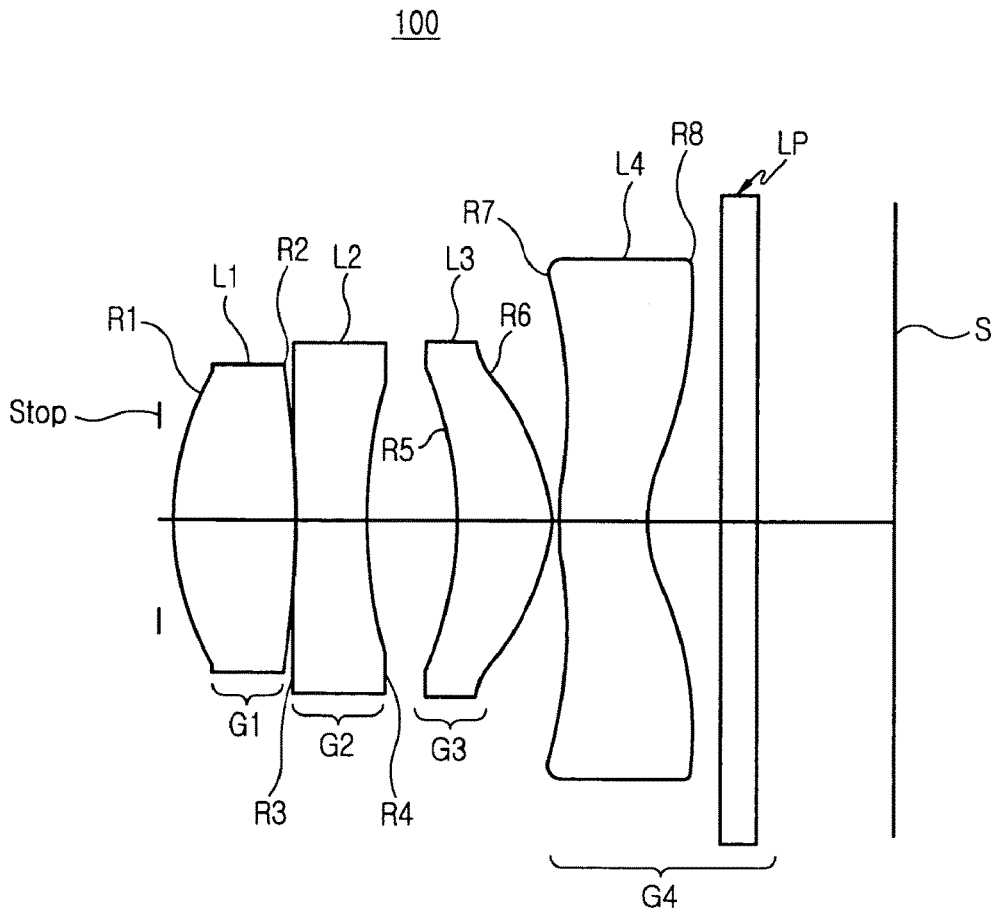
Figure 11:
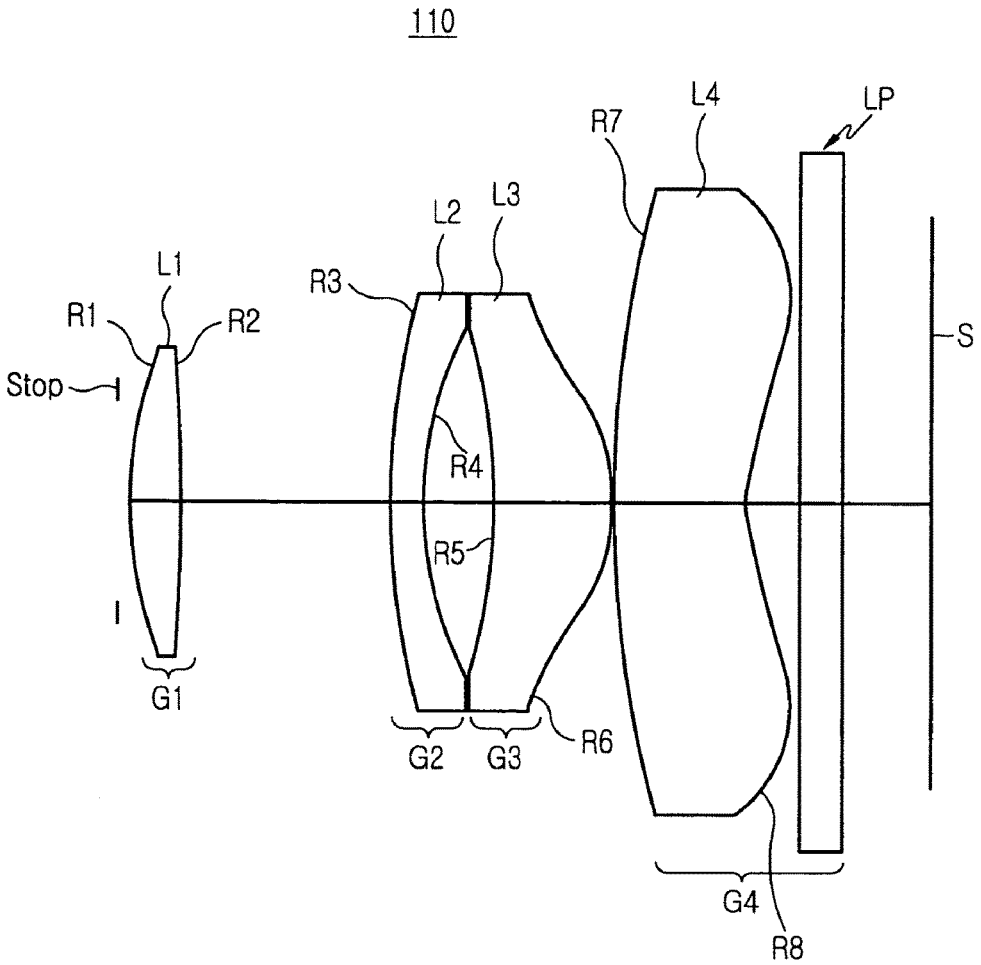
Figure 12:
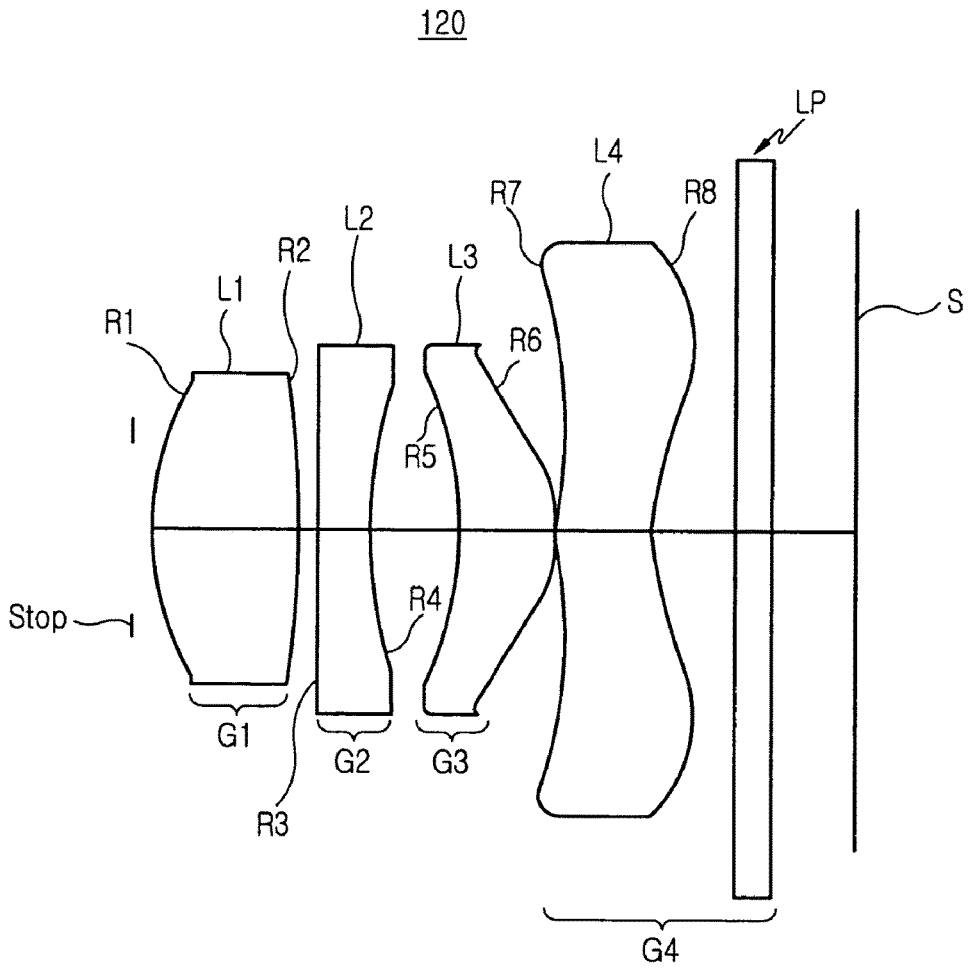
Figure 13:
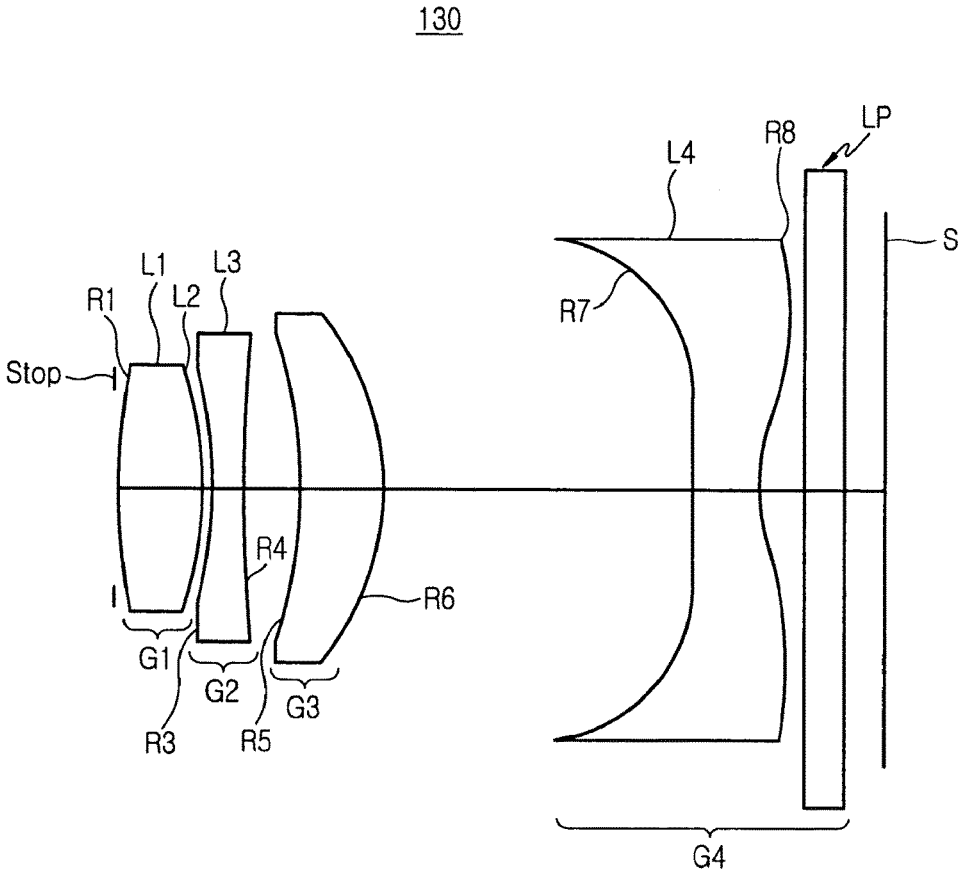
Figure 14:
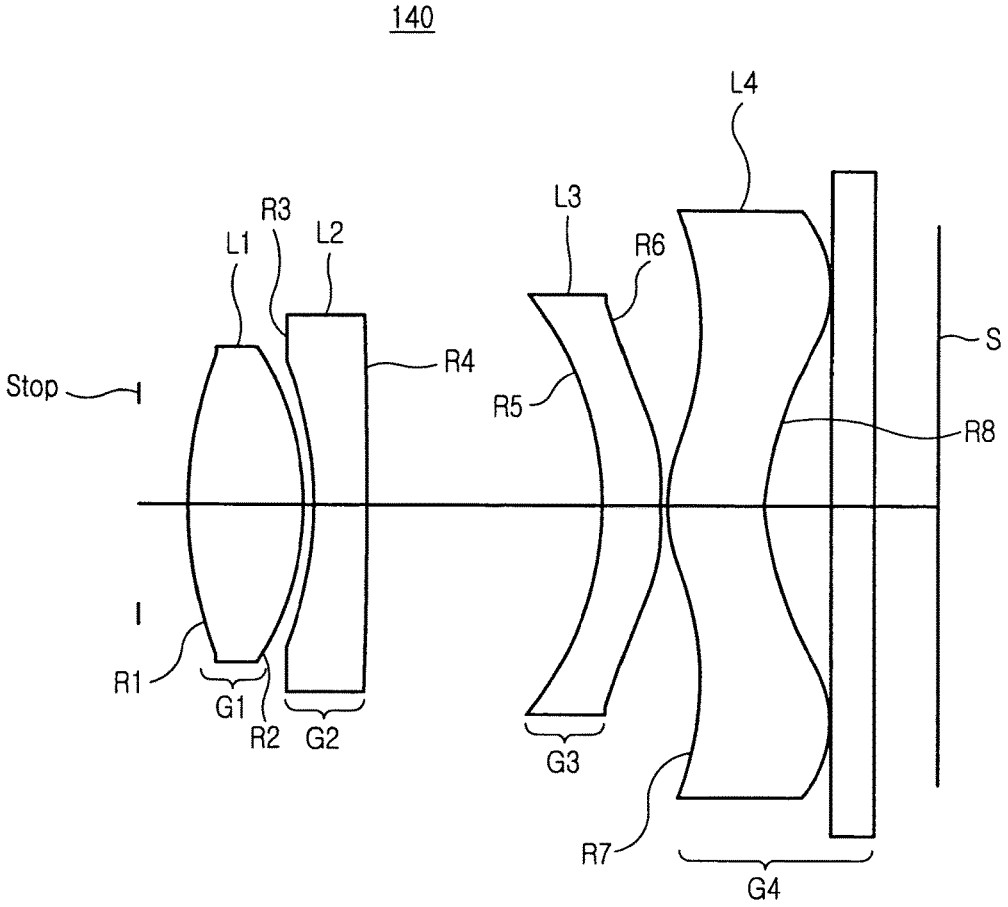

FIG. 1 is a view for illustrating an optical system according to one embodiment of the present invention. Referring to FIG. 1, an optical imaging system 10, according to the present embodiment includes an image sensor S capable of photoelectric conversion, a first lens group G1, closest to a subject and having a positive refractive power, a second lens group G2 having a negative refractive power, a third lens group G3 having a positive or negative refractive power, and a fourth lens group G4 having a positive or negative refractive power. The image sensor S is preferably embodied as a CCD or a CMOS imaging element, or the like.

Each of the first to fourth lens groups G1 to G4 can include an aspheric lens on at least one surface thereof. The fourth lens group G4 is located adjacently to the image sensor S, and a parallel flat glass LP can be disposed between the fourth lens group G4 and the image sensor S. The parallel flat glass LP is a thin film filter or an optical filter, and can function as an infrared absorption filter and the like.

The following formulas (1) to (5) illustrate the relationship between the [focus distances] *focal lengths* of the various lens groups G1 to G4 and the [focus distance] *focal length* of the optical imaging system 10.

The first lens group G1 includes at least one lens of a positive refractive power, and the optical imaging system 10 satisfies formula (1).

$$0.3 < \frac{f_1}{f} < 3.1 \quad (1)$$

In formula (1), f denotes the [synthetic focus distance] *total focal length* of the optical imaging system and $f_1$ denotes the [focus distance] *focal length* of the first lens group.

The second lens group G2 includes at least one lens of a negative refractive power, and its [focus distance] *focal length* satisfies formula (2).

$$0.3 < \frac{|f_2|}{f} < 8.99 \quad (2)$$

In formula (2), f denotes the [synthetic focus distance] *total focal length* of the optical imaging system and $f_2$ denotes the [focus distance] *focal length* of the second lens group.

The third lens group G3 includes at least one lens of a positive or negative refractive power, and its [focus distance] *focal length* can be set according to formula (3).

$$0.19 < \frac{|f_3|}{f} < \infty \quad (3)$$

In formula (3), f denotes the [synthetic focus distance] *total focal length* of the optical imaging system and $f_3$ denotes the [focus distance] *focal length* of the third lens group.

The fourth lens group G4 includes at least one lens of a positive or negative refractive power, and its [focus distance] *focal length* can be set according to formula (4).

$$0.15 < \frac{|f_4|}{f} < \infty \quad (4)$$

In formula (4), f denotes the [synthetic focus distance] *total focal length* of the optical imaging system and $f_4$ denotes the [focus distance] *focal length* of the second lens group.

The optical imaging system 10 satisfies formula (5).

$$0.45 < \frac{f}{TTL} < 1.01 \quad (5)$$

In formula (5), f denotes the [synthetic focus distance] *total focal length* of the optical imaging system and TTL denotes the distance from an iris surface to an imaging surface.

The optical imaging system 10 satisfies formula (6). The first and second lens groups G1 and G2 satisfy the optical axis direction size according to formula (6).

$$0 < \frac{d_1}{TTL} < 0.26 \quad (6)$$

In formula (6), $d_1$ denotes a separated distance between the first lens group and the second lens group on the optical axis.

The third and fourth lens groups G3 and G4 satisfy the optical axis direction size according to formula (7).

$$0 < \frac{d_3}{TTL} < 0.40 \quad (7)$$

In formula (7), $d_3$ denotes a separated distance between the third lens group and the fourth lens group on the optical axis.

The Abbe's numbers of the first and second lens groups G1 and G2 satisfy formula (8).

$$28.2 < \upsilon 1 - \upsilon 2 < 42.8 \quad (8)$$

In formula (8), $\upsilon_1$ and $\upsilon_2$ denote Abbe's numbers representing the [distribution] *dispersion* characteristics of the first and second lens groups respectively.

The aspheric definition equation can be defined by formula (9) below.

$$x = \frac{c^2y^2}{1 + \sqrt{1 - (K+1)c^2y^2}} + Ay^2 + By^6 + Cy^8 + Dy^{10} + Ey^{12} \quad (9)$$

In formula (9), x denotes the distance along the optical axis from the apex of the optical surface, y denotes the distance in the direction perpendicular to the optical axis, c denotes the curvature at the apex of the optical surface (*the inverse of a curvature radius, c=1/r*), K denotes the conic coefficient, and A, B, C, D and E denote the aspheric coefficients.

The following Tables 1 to 3 represent the curvatures at the lens surfaces, the distances between the lenses, and the thicknesses of the lenses of the optical imaging systems according to embodiments of the present invention.

The distances indicated in the aperture rows represent the distance from the stops in each embodiment to the first lens group or the incidence surface of the first lens. Further, the distances of the [subject rows] *objects* are the distances from the [subjects] *objects* to the optical systems of the corresponding embodiments, and approach infinity in the curvature.

Further, the curvatures of the surfaces indicated in respective rows of Tables 1 to 3 represent the curvatures at the apices of the optical surfaces. In Tables 1 to 3, the second and third surfaces correspond to the surfaces of both the first lens of the first lens group, and the fourth and the fifth surfaces of the second lens. The sixth and seventh surfaces correspond to the third lens, and the eighth and ninth surfaces correspond to the fourth lens. The tenth and eleventh surfaces correspond to both surfaces of the thin film filter or the optical filter, and the [upper] *image* surface corresponds to the sensor.

TABLE 1

| | Embodiment 1 | | Embodiment 2 | | Embodiment 3 | | Embodiment 4 | | Embodiment 5 | |
|---|---|---|---|---|---|---|---|---|---|---|
| | Curvature radius (r) | Distance | Curvature radius (r) | Distance | Curvature radius (r) | Distance | Curvature radius (r) | Distance | Curvature radius (r) | Distance |
| Object | ∞ | ∞ | ∞ | ∞ | ∞ | ∞ | ∞ | ∞ | ∞ | ∞ |
| Stop | ∞ | 0.097 | ∞ | 0.158 | ∞ | 0.118 | ∞ | 0.030 | ∞ | 0.0594 |
| 2;R1 | 2.308 | 1.17 | 1.90143 | 1.174 | 3.27233 | 1.100 | 2.31076 | 1.066 | 2.9744 | 1.500 |
| 3;R2 | −6.369 | 0.14 | −1.20746 | 0.050 | 4.67332 | 0.103 | −7.4386 | 0.10 | −8.7847 | 0.4669 |
| 4;R3 | −396.532 | 0.5357 | −1.74939 | 0.363658 | 3.28408 | 0.671321 | 13.09940 | 0.300 | 19.62274 | 0.6000 |
| 5;R4 | 3.85393 | 0.8800640 | 4.33678 | 0.626369 | 2.76273 | 0.32772 | 3.44803 | 0.74667 | 3.68254 | 1.020392 |
| 6;R5 | −2.8102 | 0.801423 | −2.16510 | 1.200 | −9.54821 | 0.900 | −2.37523 | 0.797763 | 49.3243 | 1.500 |
| 7;R6 | −1.30844 | 0.108171 | −1.54462 | 0.959357 | −1.66438 | 0.035965 | −1.17766 | 0.061159 | −0.6061 | 0.3000 |
| 8;R7 | 2.78412 | 0.798390 | 22.78452 | 0.643246 | 2.38024 | 0.750438 | 2.7701 | 0.813576 | −0.9404 | 0.8410 |
| 9;R8 | 1.10058 | 0.6 | 2.80755 | 0.300 | 1.31748 | 1.200 | 1.10025 | 0.420 | 1.3115 | 0.5333 |
| $10^{th}$ surface | ∞ | 0.3 | ∞ | 0.300 | ∞ | 0.345836 | ∞ | 0.300 | ∞ | 0.400 |
| $11^{th}$ surface | ∞ | 0.594705 | ∞ | 0.78896 | ∞ | 1.808969 | ∞ | 0.729 | ∞ | 0.552 |
| Image surface | ∞ | −0.004867 | ∞ | 0.060517 | ∞ | −0.024762 | ∞ | −0.001979 | ∞ | −0.0229 |

TABLE 2

| | Embodiment 6 | | Embodiment 7 | | Embodiment 8 | | Embodiment 9 | | Embodiment 10 | |
|---|---|---|---|---|---|---|---|---|---|---|
| | Curvature radius (r) | Distance | Curvature radius (r) | Distance | Curvature radius (r) | Distance | Curvature radius (r) | Distance | Curvature radius (r) | Distance |
| Object | ∞ | ∞ | ∞ | ∞ | ∞ | ∞ | ∞ | ∞ | ∞ | ∞ |
| Stop | ∞ | 0.6476 | ∞ | 0.3463 | ∞ | 0.4555 | ∞ | 0.030 | ∞ | 0.112 |
| $2^{nd}$ surface | 3.13902 | 1.4131 | 2.66332 | 1.5000 | 3.25081 | 0.8732 | 2.68778 | 1.151 | 2.32028 | 1.0409 |
| $3^{rd}$ surface | −3.0951 | 0.1000 | −3.9930 | 0.1323 | −3.4043 | 0.1458 | −6.9943 | 0.100 | −6.2290 | 0.000 |
| $4^{th}$ surface | −3.2023 | 0.3000 | −5.3522 | 0.6000 | −2.6909 | 0.3000 | −12.169 | 0.359 | −40.0905 | 0.600 |
| $5^{th}$ surface | −17.430 | 2.1265 | 8.06170 | 1.0825 | 17.0230 | 0.1621 | 8.28938 | 2.268 | 4.30201 | 0.758760 |
| $6^{th}$ surface | −2.5800 | 0.8000 | −1.9343 | 0.8000 | −13.170 | 1.9366 | −3.1380 | 0.958 | −2.3804 | 0.800 |
| $7^{th}$ surface | −2.9025 | 0.0300 | −1.6944 | 0.0300 | −1.0714 | 0.0300 | −2.2201 | 0.571 | −1.18271 | 0.050 |
| $8^{th}$ surface | 1.6766 | 1.0510 | 1.43882 | 0.8278 | 2.07137 | 0.5406 | −46.094 | 0.439512 | 2.97821 | 0.759082 |
| $9^{th}$ surface | 1.280758 | 0.6575 | 1.13450 | 0.5683 | 1.00140 | 0.7500 | 3.15688 | 0.635425 | 1.14396 | 0.60000 |
| $10^{th}$ surface | ∞ | 0.3999 | ∞ | 0.3384 | ∞ | 0.3999 | ∞ | 0.400 | ∞ | 0.300 |
| $11^{th}$ surface | ∞ | 0.5012 | ∞ | 1.0033 | ∞ | 0.3940 | ∞ | 1.087873 | ∞ | 1.15 |
| Image surface | ∞ | −0.001 | ∞ | −0.0033 | ∞ | 0.0115 | ∞ | −0.0026 | ∞ | +0.001717 |

TABLE 3

| | Embodiment 11 | | Embodiment 12 | | Embodiment 13 | | Embodiment 14 | |
|---|---|---|---|---|---|---|---|---|
| | Curvature radius (r) | Distance | Curvature radius (r) | Distance | Curvature radius (r) | Distance | Curvature radius (r) | Distance |
| Object | ∞ | ∞ | ∞ | ∞ | ∞ | ∞ | ∞ | ∞ |
| Stop | ∞ | 0.122343 | ∞ | 0.172863 | ∞ | 0.0300 | ∞ | 0.480264 |
| 2nd surface | 3.87998 | 0.490300 | 2.31854 | 1.219838 | 4.41591 | 0.81255 | 3.01153 | 1.10000 |
| 3rd surface | −20.7340 | 2.001108 | −6.32101 | 0.159417 | −5.0714 | 0.1000 | −3.45345 | 0.10000 |
| 4th surface | 7.75795 | 0.300000 | −302.670 | 0.427352 | −4.568 | 0.3000 | −3.57593 | 0.50000 |
| 5th surface | 3.60180 | 0.672147 | 3.93461 | 0.742239 | 17.81786 | 0.55615 | −25.0277 | 2.23581 |
| 6th surface | −5.48009 | 1.123412 | −2.26332 | 0.80000 | −10.2402 | 0.8000 | −2.62654 | 0.54408 |
| 7th surface | −1.75190 | 0.03000 | −1.16737 | 0.000 | −3.2556 | 2.9643 | −2.8477 | 0.08336 |
| 8th surface | 4.24622 | 1.243467 | 2.65978 | 0.796021 | 6.79551 | 0.7000 | 1.58235 | 0.88966 |
| 9th surface | 1.69995 | 0.53333 | 1.10575 | 0.70000 | 2.49781 | 0.4000 | 1.22608 | 0.63848 |
| 10th surface | ∞ | 0.399997 | ∞ | 0.3000 | ∞ | 0.4000 | ∞ | 0.39999 |
| 11th surface | ∞ | 0.85132 | ∞ | 0.69052 | ∞ | 0.3855 | ∞ | 0.60000 |
| Image surface | ∞ | −0.0126 | ∞ | 0.005756 | ∞ | −0.0054 | ∞ | −0.00001 |

Embodiment 1

The aspheric surfaces of the lenses constituting the optical imaging system according to the first embodiment are as presented in Table 4. The spherical surfaces and other conditions are as indicated in Table 1. The aspheric surfaces can be determined according to formula (9). The optical imaging system 10 according to the first embodiment includes a first lens group G1 having a positive refractive power, a second lens group G2 having a negative refractive power, a third lens group G3 having a positive or negative refractive power, a fourth lens group G4 having a positive or negative refractive power, a stop, and a thin film filter or an optical filter.

The stop is located on the incidence side of the optical imaging system 10, and the [introduced] *incident* light is output to the first lens group G1. The stop is used to regulate the amount of the light introduced into the optical imaging system 10, and is separated from the first lens group G1 by 0.097005 mm.

The first lens group G1 includes a first lens L1 which outputs the light [introduced] *incident* through the stop to the second lens group G2. The first lens L1 includes second and third surfaces R1 and R2 which are aspheric, formed of a material having a refractive index of 1.529960 and a [distribution value] *dispersion constant* of 55.8. The thickness of the first lens L1 is 1.170132 mm. Note that the first surface designates the [irisi] *stop*.

The second lens group G2 includes a second lens L2 having a refractive index of 1.7552 and a [distribution value] *dispersion constant* of 27.53. The second lens L2 has fourth and fifth surfaces R3 and R4 which are aspheric. Referring to Table 1, the second lens group G2 is separated from the first lens L1 by 0.14 mm, and the center of the curvature is located on the optical axis.

The third lens group G3 includes a third lens L3. Both surfaces R5 and R6 of the third lens L3 are aspheric. The third lens L3 is separated from the second lens L2 by 0.088064 mm, and has a thickness of 0.801423 mm. The third lens L3 is formed of a material having a refractive index of 1.52996 and a [distribution value] *dispersion constant* of 55.8.

The fourth lens group G4 includes a fourth lens L4. Both surfaces R7 and R8 of the fourth lens L4 are aspheric. The fourth lens L4 is formed of a material having a refractive index of 1.52996 and a [distribution value] *dispersion constant* of 55.8. The thin film filter or the optical filter LP is formed on one surface of a BSC7-HOYA substrate by optical thin film deposition, and outputs partially restricted light through the fourth lens L4. The thin film filter or the optical filter LP is separated from the fourth lens L4 by 0.6 mm, and the thickness thereof is 0.3 mm.

Embodiment 2

The optical imaging system 20 according to the second embodiment includes a first lens group G1 having a positive refractive power, a second lens group G2 having a negative refractive power, a third lens group G3 having a positive or negative refractive power, a fourth lens group G4 having a positive or negative refractive power, a stop, and a thin film filter or an optical filter (LP).

The first lens group G1 includes a first lens L1, both surfaces R1 and R2 of which are aspheric. The thickness of the first lens L1 is 1.174399 mm. The first lens L1 is separated from the stop by 0.158423 mm.

The second lens group G2 includes a second lens L2 having a refractive index of 1.7552 and a [distribution value] *dispersion constant* of 27.53, and the second lens L2 has fourth and fifth surfaces R3 and R4 which are aspheric. Referring to Table 1, the second lens L2 is separated from the first lens L1 by 0.05 mm, and has a thickness of 0.363658 mm.

The third lens group G3 includes a third lens L3. Both surfaces R5 and R6 of the third lens L3 are aspheric. The third lens L3 is separated from the second lens L2 by 0.626369 mm, and has a thickness of 1.200 mm. The third lens L3 is formed of a material having a refractive index of 1.52996 and a [distribution value] *dispersion constant* of 55.8.

The fourth lens group G4 includes a fourth lens L4. Both surfaces R7 and R8 of the fourth lens L4 are aspheric. The fourth lens L4 is formed of a material having a refractive index of 1.52996 and a [distribution value] *dispersion constant* of 55.8. The thin film filter or the optical filter LP is formed on one surface of a BSC7-HOYA substrate by optical thin film deposition, and outputs partially restricted light through the fourth lens L4. The thin film filter or the optical filter LP is separated from the fourth lens L4 by 0.3 mm.

The aspheric specifications of the first to fourth lenses according to the second embodiment can be calculated as shown in Table 5 according to formula (9).

TABLE 4

| | K | A | B | C | D | E |
|---|---|---|---|---|---|---|
| 2(R1) | −0.293462 | −0.500119E−02 | 0.174440E−01 | −0.454965E−01 | 0.46924E−01 | −0.195854E−01 |
| 3(R2) | −9.260888 | −0.800894E−02 | −0.853100E−02 | −0.490518E−02 | −0.122591E−02 | 0.122831E−03 |
| 4(R3) | 106224.0635 | −0.120921E−01 | −0.705929E−02 | −0.207145E−02 | −0.161995E−03 | −0.210957E−03 |
| 5(R4) | 0.365689 | 0.749905E−03 | 0.131150E−02 | 0.778014E−04 | −0.121719E−03 | 0.572661E−03 |
| 6(R5) | −24.431171 | −0.672890E−01 | 0.18948E−01 | 0.961734E−02 | −0.435003E−02 | 0.806518E−03 |
| 7(R6) | −2.571360 | −0.335648E−01 | −0.109854E−01 | 0.181423E−01 | −0.489429E−02 | 0.747733E−03 |
| 8(R7) | −17.862211 | −0.795409E−01 | 0.310568E−01 | −0.553846E−02 | 0.730076E−04 | 0.544935E−04 |
| 9(R8) | −4.629831 | −0.533642E−01 | 0.17364E−01 | −0.392400E−02 | 0.440467E−03 | −0.212501E−04 |

TABLE 5

| | K | A | B | C | D | E |
|---|---|---|---|---|---|---|
| 2(R1) | −0.257713 | −0.515708E−02 | 0.209747E−01 | −0.505970E−01 | 0.447308E−01 | −0.188477E−01 |
| 3(R2) | −18.708087 | −0.1032054E−01 | −0.105518E−01 | −0.865314E−02 | −0.272928E−02 | 0.123342E−03 |
| 4(R3) | −43.346401 | −0.181606E−01 | −0.384568E−02 | 0.397337E−03 | −0.676785E−03 | −0.185398E−02 |
| 5(R4) | −0.927369 | −0.184534E−02 | 0.328550E−01 | 0.145702E−01 | −0.330705E−02 | 0.451156E−03 |
| 6(R5) | 1.000662 | −0.114554E+00 | 0.213009E−01 | 0.28671E−01 | 0.193745E−02 | −0.723361E−02 |
| 7(R6) | −1.421093 | −0.372122E−01 | −0.953273E−02 | 0.172586E−01 | −0.507483E−02 | 0.456643E−03 |
| 8(R7) | −2680755.274 | −0.776437E−01 | 0.326426E−01 | −0.516378E−02 | 0.139662E−03 | 0.354080E−05 |
| 9(R8) | −8.098312 | −0.608029E−01 | 0.173038E−01 | −0.354982E−02 | 0.459123E−03 | −0.308217E−04 |

Embodiment 3

The optical imaging system 30 according to the third embodiment includes a first lens group G1 having a positive refractive power, a second lens group G2 having a negative refractive power, a third lens group G3 having a positive or negative refractive power, a fourth lens group G4 having a positive or negative refractive power, a stop, and a thin film filter or an optical filter.

The first lens group G1 includes a first lens L1, both surfaces R1 and R2 of which are aspheric. Referring to Table 1, the thickness of the first lens L1 is 1.10000 mm. The first lens L1 is separated from the stop by [0.18539] *0.118* mm.

The second lens group G2 includes a second lens L2 having a refractive index of 1.7552 and a [distribution value] *dispersion constant* of 27.53. The second lens L2 has fourth and fifth surfaces R3 and R4 which are aspheric. Referring to Table 1, the second lens L2 is separated from the first lens L1 by 0.103084 mm, and the thickness thereof is 0.671321 mm.

The third lens group G3 includes a third lens L3. Both surfaces R5 and R6 of the third lens L3 are aspheric. The third lens L3 is separated from the second lens L2 by 0.327722 mm, and has a thickness of 0.9 mm. The third lens L3 is formed of a material having a refractive index of 1.48749 and a [distribution value] *dispersion constant* of 70.4058.

The fourth lens group G4 includes a fourth lens L4. Both surfaces R7 and R8 of the fourth lens L4 are aspheric. The fourth lens L4 is formed of a material having a refractive index of 1.516799 and a [distribution value] *dispersion constant* of 56.3954. The thin film filter or the optical filter LP is formed on one surface of a BSC7-HOYA substrate by optical thin film deposition, and outputs partially restricted light through the fourth lens L4. The thin film filter or the optical filter LP is separated from the fourth lens L4 by 1.2 mm.

The aspheric specifications of the first to fourth lenses according to the third embodiment can be calculated as shown in Table 6 according to formula (9).

Embodiment 4

The optical imaging system 40 according to the fourth embodiment includes a first lens group G1 having a positive refractive power, a second lens group G2 having a negative refractive power, a third lens group G3 having a positive or negative refractive power, a fourth lens group G4 having a positive or negative refractive power, a stop, and a thin film filter or an optical filter.

The first lens group G1 includes a first lens L1, both surfaces R1 and R2 of which are aspheric. Referring to Table 1, the thickness of the first lens L1 is [1.16687] *1.066* mm. The first lens L1 is separated from the stop by 0.03 mm. The first lens L1 is formed of a material having a refractive index of 1.531449 and a [distribution value] *dispersion constant* of 66.1381.

The second lens group G2 includes a second lens L2 having a refractive index of 1.671174 and a [distribution value] *dispersion constant* of 32.0197. The fourth and fifth surfaces R3 and R4 of the second lens L2 are spherical. Referring to Table 1, the second lens L2 is separated from the first lens L1 by 0.102841 mm, and the thickness thereof is 0.3 mm.

The third lens group G3 includes a third lens L3. Both surfaces R5 and R6 of the third lens L3 are aspheric. The third lens L3 is separated from the second lens L2 by 0.746673 mm, and has a thickness of [0.9] *0.797763* mm. The third lens L3 is formed of a material having a refractive index of 1.532928 and a [distribution value] *dispersion constant* of 66.015.

The fourth lens group G4 includes a fourth lens L4. Eighth and ninth surfaces R7 and R8 of the fourth lens L4 are aspheric. The fourth lens L4 is formed of a material having a refractive index of 1.545534 and a [distribution value] *dispersion constant* of 65.0098. The thin film filter or the optical filter LP is formed on one surface of a BSC7-HOYA substrate by optical thin film deposition, and outputs partially restricted light through the fourth lens L4. The thin film filter or the optical filter LP is separated from the fourth lens L4 by 0.420622 mm.

TABLE 6

| | K | A | B | C | D | E |
|---|---|---|---|---|---|---|
| 2(R1) | −1.835982 | −0.540163E−02 | 0.375499E−02 | −0.142352E−01 | 0.131732E−01 | −0.519886E−02 |
| 3(R2) | −41.048843 | −0.229191E−02 | −0.938832E−02 | 0.209185E−02 | 0.433396E−02 | −0.111937E−02 |
| 4(R3) | −11.973390 | −0.112168E−01 | −0.268986E−02 | −0.187660E−03 | 0.394245E−03 | −0.289163E−03 |
| 5(R4) | −1.905279 | −0.658295E−02 | 0.186594E−03 | −0.748272E−03 | −0.467662E−03 | 0.229792E−04 |
| 6(R5) | −276.330987 | −0.708063E−2 | 0.914221E−02 | 0.288806E−02 | −0.131006E−02 | −0.158700E−03 |
| 7(R6) | −3.139053 | −0.110843E−01 | −0.336114E−02 | 0.786618E−02 | −0.901802E−03 | 0.284397E−03 |
| 8(R7) | −1.570846 | −0.495767E−01 | 0.157197E−01 | −0.238177E−02 | 0.155217E−04 | 0.480583E−04 |
| 9(R8) | −3.484978 | −0.155739E−01 | 0.599301E−01 | −0.140844E−02 | 0.125464E−03 | 0.154242E−04 |

The aspheric specifications of the first, third, and fourth lenses according to the fourth embodiment can be calculated as shown in Table 7 according to formula (9).

TABLE 7

| | K | A | B | C | D | E |
|---|---|---|---|---|---|---|
| 2(R1) | −0.414786 | −0.681554E−02 | 0.202808E−01 | −0.458051E−01 | 0.486110E−01 | −0.192443E−01 |
| 3(R2) | −47.977483 | 0.753038E−03 | −0.494574E−03 | −0.938500E−03 | −0.477371E−03 | 0.427775E−03 |
| 4(R3) | | | | | | |
| 5(R4) | | | | | | |
| 6(R5) | −15.896356 | −0.668718E−1 | 0.195572E−01 | 0.949661E−02 | −0.450552E−02 | 0.799452E−03 |
| 7(R6) | −2.447435 | −0.355564E−01 | −0.106736E−01 | 0.187415E−01 | −0.453123E−02 | 0.913004E−03 |
| 8(R7) | −13.319650 | −0.816238E−01 | 0.306218E−01 | −0.557765E−02 | 0.732077E−04 | 0.574664E−04 |
| 9(R8) | −4.692781 | −0.568388E−01 | 0.179127E−01 | −0.392127E−02 | 0.437571E−03 | −0.21894E−04 |

Embodiment 5

The optical imaging system 50 according to the fifth embodiment includes a first lens group G1 having a positive refractive power, a second lens group G2 having a negative refractive power, a third lens group G3 having a positive or negative refractive power, a fourth lens group G4 having a positive or negative refractive power, a stop, and a thin film filter or an optical filter.

The first lens group G1 includes a first lens L1 in which both surfaces R1 and R2 are aspheric. Referring to Table 1, the thickness of the first lens L1 is 1.5 mm. The first lens L1 is separated from the stop by 0.059478 mm. The first lens L1 is formed of a material having a refractive index of 1.533230 and a [distribution value] *dispersion constant* of 65.9899.

The second lens group G2 includes a second lens L2 having a refractive index of 1.755201 and a [distribution value] *dispersion constant* of 27.5795. The fourth and fifth surfaces R3 and R4 of the second lens L2 are spherical. Referring to Table 1, the second lens L2 is separated from the first lens L1 by 0.466939 mm, and the thickness thereof is 0.6 mm.

The third lens group G3 includes a third lens L3. The third lens L3 includes sixth and seventh surfaces R5 and R6 which are aspheric. The third lens L3 is separated from the second lens L2 by 1.020392 mm, and has a thickness of 1.5 mm. The third lens L3 is formed of a material having a refractive index of 1.526846 and a [distribution value] *dispersion constant* of 53.030473.

The fourth lens group G4 includes a fourth lens L4. The fourth lens L4 includes eighth and ninth surfaces R7 and R8 which are aspheric. The fourth lens L4 is formed of a material having a refractive index of 1.537416 and a [distribution value] *dispersion constant* of 50.1447. The thin film filter or the optical filter LP is formed on one surface of a BSC7-HOYA substrate by optical thin film deposition, and outputs partially restricted light through the fourth lens L4. The thin film filter or the optical filter LP is separated from the fourth lens L4 by 0.533392 mm.

The aspheric specifications of the first, third, and fourth lenses according to the fifth embodiment can be calculated as shown in Table 8 according to formula (9).

TABLE 8

| | K | A | B | C | D | E |
|---|---|---|---|---|---|---|
| 2(R1) | −0.394400 | −0.272171E−02 | 0.416066E−02 | −0.607051E−02 | 0.380128E−02 | −0.863417E−03 |
| 3(R2) | −24.090048 | −0.412473E−03 | 0.555552E−03 | −0.275809E−03 | −0.176666E−03 | 0.988739E−04 |
| 4(R3) | | | | | | |
| 5(R4) | | | | | | |
| 6(R5) | 276.291590 | −0.271502E−1 | 0.329418E−02 | 0.106440E−02 | −0.323744E−03 | 0.428169E−04 |
| 7(R6) | −3.116597 | −0.205921E−01 | −0.130529E−02 | 0.278790E−02 | −0.318606E−03 | 0.358108E−04 |
| 8(R7) | −6.168567 | −0.189375E−01 | 0.732132E−02 | −0.780195E−03 | 0.685421E−05 | 0.328986E−05 |
| 9(R8) | −15.211827 | −0.200112E−01 | 0.342095E−02 | −0.566744E−03 | 0.330318E−04 | −0.670599E−06 |

Embodiment 6

The optical imaging system 60 according to the sixth embodiment includes a first lens group G1 having a positive refractive power, a second lens group G2 having a negative refractive power, a third lens group G3 having a positive or negative refractive power, a fourth lens group G4 having a positive or negative refractive power, a stop and a thin film filter or an optical filter.

The first lens group G1 includes a first lens L1 in which both surfaces R1 and R2 are aspheric. Referring to Table 2, the thickness of the first lens L1 is 1.413171 mm. The first lens L1 is separated from the stop by 0.647673 mm. The first lens L1 is formed of a material having a refractive index of 1.529960 and a [distribution value] *dispersion constant* of 55.8.

The second lens group G2 includes a second lens L2 having a refractive index of 1.755201 and a [distribution value] *dispersion constant* of 27.5795. The fourth and fifth surfaces R3 and R4 of the second lens L2 are spherical. Referring to Table 2, the second lens L2 is separated from the first lens L1 by 0.1 mm. The second lens L2 has a thickness of [0.6] *0.3* mm.

The third lens group G3 includes a third lens L3. The third lens L3 includes sixth and seventh surfaces R5 and R6 which are aspheric. The third lens L3 is separated from the second lens L2 by 2.126507 mm, and has a thickness of 0.8 mm. The third lens L3 is formed of a material having a refractive index of 1.675133 and a [distribution value] *dispersion constant* of 49.8062.

The fourth lens group G4 includes a fourth lens L4. The fourth lens L4 includes eighth and ninth surfaces R7 and R8 which are aspheric. The fourth lens L4 is formed of a material having a refractive index of 1.52996 and a [distribution value] *dispersion constant* of 55.8. The thin film filter or the optical filter LP is formed on one surface of a BSC7-HOYA substrate by optical thin film deposition, and outputs the light passed through the fourth lens L4, with the light partially restricted. The thin film filter or the optical filter LP is separated from the fourth lens L4 by 0.657592 mm.

The aspheric specifications of the first, third, and fourth lenses according to the sixth embodiment can be calculated as shown in Table 9 according to formula (9).

TABLE 9

| | K | A | B | C | D | E |
|---|---|---|---|---|---|---|
| 2(R1) | −0.519080 | −0.306884E−02 | 0.210023E−02 | −0.511064E−02 | 0.297608E−02 | −0.933653E−03 |
| 3(R2) | −1.903494 | −0.119853E−01 | −0.166943E−02 | −0.779414E−03 | 0.297154E−03 | −0.211494E−03 |
| 4(R3) | | | | | | |
| 5(R4) | | | | | | |
| 6(R5) | −23.161960 | −0.342151E−01 | 0.297570E−02 | 0.127086E−02 | −0.331654E−03 | −0115883E−05 |
| 7(R6) | −2.184987 | −0.101073E−01 | −0.928938E−03 | 0.229837E−02 | −0.435484E−03 | 0.286609E−04 |
| 8(R7) | −6.252505 | −0.387574E−01 | 0.750058E−02 | −0.666702E−03 | 0.344665E−05 | 0.497617E−06 |
| 9(R8) | −3.730467 | −0.209098E−01 | 0.387332E−02 | −0.561418E−03 | 0.327093E−04 | −0.126355E−05 |

Embodiment 7

The optical imaging system 70 according to the seventh embodiment includes a first lens group G1 having a positive refractive power, a second lens group G2 having a negative refractive power, a third lens group G3 having a positive or negative refractive power, a fourth lens group G4 having a positive or negative refractive power, a stop, and a thin film filter or an optical filter.

The first lens group G1 includes a first lens L1. The second and third surfaces R1 and R2 of the first lens L1 are aspheric. Referring to Table 2, the thickness of the first lens L1 is 1.5 mm. The first lens L1 is separated from the stop by 0.346363 mm. The first lens L1 is formed of a material having a refractive index of 1.529960 and a [distribution value] *dispersion constant* of 55.8.

The second lens group G2 includes a second lens L2 having a refractive index of 1.755201 and a [distribution value] *dispersion constant* of 27.5795. The fourth and fifth surfaces R3 and R4 of the second lens L2 are spherical. Referring to Table 2, the second lens L2 is separated from the first lens L1 by 0.132395 mm. The second lens has a thickness of 0.6 mm.

The third lens group G3 includes a third lens L3. The third lens L3 includes sixth and seventh surfaces R5 and R6 which are aspheric. The third lens L3 is separated from the second lens L2 by 1.082514 mm, and has a thickness of 0.8 mm. The third lens L3 is formed of a material having a refractive index of 1.52996 and a [distribution value] *dispersion constant* of 55.8.

The fourth lens group G4 includes a fourth lens L4. The fourth lens L4 includes eighth and ninth surfaces R7 and R8 which are aspheric. The fourth lens L4 is formed of a material having a refractive index of 1.581283 and a [distribution value] *dispersion constant* of 62.5343. The thin film filter or the optical filter LP is formed on one surface of a BSC7-HOYA substrate by optical thin film deposition, and outputs partially restricted light through the fourth lens L4. The thin film filter or the optical filter LP is separated from the fourth lens L4 by 0.568307 mm.

The aspheric specifications of the first, third, and fourth lenses according to the seventh preferred embodiment can be calculated as shown in Table 10 according to formula (9).

TABLE 10

| | K | A | B | C | D | E |
|---|---|---|---|---|---|---|
| 2(R1) | −0.225057 | −0.331040E−02 | 0.124863E−01 | −0.182585E−01 | 0.133184E−01 | −0.345182E−02 |
| 3(R2) | −8.046311 | −0.167705E−02 | 0.328944E−02 | −0.511098E−03 | −0.598276E−04 | 0.289249E−03 |
| 4(R3) | | | | | | |
| 5(R4) | | | | | | |
| 6(R5) | −16.247560 | −0.465774E−01 | 0.113697E−01 | 0.484777E−02 | −0.139992E−02 | 0.124383E−03 |
| 7(R6) | −1.681469 | −0.201264E−01 | −0.355531E−02 | 0.780629E−02 | −0.305484E−04 | 0.221913E−03 |
| 8(R7) | −3.679745 | −0.597223E−01 | 0.166450E−01 | −0.222994E−02 | 0.305484E−04 | 0.102808E−04 |
| 9(R8) | −3.208375 | −0.436003E−01 | 0.103498E−01 | −0.174130E−02 | 0.143919E−03 | −0.563246E−05 |

Embodiment 8

The optical imaging system 80 according to the eighth embodiment includes a first lens group G1 having a positive refractive power, a second lens group G2 having a negative refractive power, a third lens group G3 having a positive or negative refractive power, a fourth lens group G4 having a positive or negative refractive power, a stop, and a thin film filter or an optical filter.

The first lens group G1 includes a first lens L1. The second and third surfaces R1 and R2 of the first lens L1 are aspheric. Referring to Table 2, the thickness of the first lens L1 is 0.873219 mm. The first lens L1 is separated from the stop by 0.455563 mm. The first lens L1 is formed of a material having a refractive index of 1.618194 and a [distribution value] *dispersion constant* of 60.4374.

The second lens group G2 includes a second lens L2 having a refractive index of 1.755201 and a [distribution value] *dispersion constant* of 27.5795. The fourth and fifth surfaces R3 and R4 of the second lens L2 are spherical. Referring to Table 2, the second lens L2 is separated from the first lens L1 by 0.145862 mm. The second lens has a thickness of 0.3 mm.

The third lens group G3 includes a third lens L3. The third lens L3 includes sixth and seventh surfaces R5 and R6 which are aspheric. The third lens L3 is separated from the second lens L2 by 0.162161 mm, and has a thickness of 1.936693 mm. The third lens L3 is formed of a material having a refractive index of 1.62041 and a [distribution value] *dispersion constant* of 60.3236.

The fourth lens group G4 includes a fourth lens L4. The fourth lens L4 includes eighth and ninth surfaces R7 and R8 which are aspheric. The fourth lens L4 is formed of a material having a refractive index of 1.755201 and a [distribution value] *dispersion constant* of 27.5795. The thin film filter or the optical filter LP is formed on one surface of a BSC7-HOYA substrate by optical thin film deposition, and outputs partially restricted light passed through the fourth lens L4. The thin film filter or the optical filter LP is separated from the fourth lens L4 by 0.75533392 mm.

The aspheric specifications of the first, third, and fourth lenses according to the fifth embodiment can be calculated as shown in Table 11 according to formula (9).

TABLE 11

| | K | A | B | C | D | E |
|---|---|---|---|---|---|---|
| 2(R1) | −1.191537 | −0.688942E−02 | 0.45124E−02 | −0.510228E−02 | 0.398074E−02 | −0.101575E−02 |
| 3(R2) | −18.472343 | −0.122184E−01 | −0.263919E−03 | 0.484905E−03 | −0.122042E−03 | −0.255869E−03 |
| 4(R3) | | | | | | |
| 5(R4) | | | | | | |
| 6(R5) | −131.77000 | −0.157791E−01 | 0.64132E−02 | 0.126895E−02 | −0.440931E−03 | −0.131678E−04 |
| 7(R6) | −1.874970 | −0.219439E−01 | −0.444306E−02 | 0.215012E−02 | −0.346726E−03 | 0.643482E−04 |
| 8(R7) | −2.843204 | −0.606407E−01 | 0.869752E−02 | 0.885038E−04 | 0.256944E−04 | −0.27499E−04 |
| 9(R8) | −2.494280 | −0.463456E−01 | 0.597186E−02 | −0.418213E−03 | 0.361972E−04 | −0.371985E−05 |

Embodiment 9

The optical imaging system 90 according to the ninth embodiment includes a first lens group G1 having a positive refractive power, a second lens group G2 having a negative refractive power, a third lens group G3 having a positive or negative refractive power, a fourth lens group G4 having a positive or negative refractive power, a stop, and a thin film filter or an optical filter.

The first lens group G1 includes a first lens L1. The second and third surfaces R1 and R2 are aspheric. Referring to Table 2, the thickness of the first lens L1 is 1.151183 mm. The first lens L1 is separated from the stop by 0.03 mm. The first lens L1 is formed of a material having a refractive index of 1.544806 and a [distribution value] *dispersion constant* of 65.0658.

The second lens group G2 includes a second lens L2 having a refractive index of 1.730603 and a [distribution value] *dispersion constant* of 29.7565. The fourth and fifth surfaces R3 and R4 of the second lens L2 are spherical. Referring to Table 2, the second lens L2 is separated from the first lens L1 by 0.1 mm. The second lens has a thickness of 0.359346 mm.

The third lens group G3 includes a third lens L3. The third lens L3 includes sixth and seventh surfaces R5 and R6 which are aspheric. The third lens L3 is separated from the second lens L2 by 2.268589 mm, and has a thickness of 0.958835 mm. The third lens L3 is formed of a material having a refractive index of 1.581703 and a [distribution value] *dispersion constant* of 41.1859.

The fourth lens group G4 includes a fourth lens L4. The fourth lens L4 includes eighth and ninth surfaces R7 and R8 which are aspheric. The fourth lens L4 is formed of a material having a refractive index of 1.590309 and a [distribution value] *dispersion constant* of 61.9836. The thin film filter or the optical filter LP is formed on one surface of a BSC7-HOYA substrate by optical thin film deposition, and outputs partially restricted light through the fourth lens L4. The thin film filter or the optical filter LP is separated from the fourth lens L4 by 0.635425 mm.

The aspheric specifications of the first, third, and fourth lenses according to the ninth embodiment can be calculated as shown in Table 12 according to formula (9).

TABLE 12

| | K | A | B | C | D | E |
|---|---|---|---|---|---|---|
| 2(R1) | −0.430373 | −0.390591E−02 | 0.392143E−02 | −0.677606E−02 | 0.349668E−02 | −0.844170E−03 |
| 3(R2) | −1.343031 | −0.390591E−02 | −0.221724E−02 | −0.442053E−03 | 0.325453E−04 | −0.124565E−03 |
| 4(R3) | | | | | | |
| 5(R4) | | | | | | |
| 6(R5) | −7.614910 | −0.468815E−01 | 0.861470E−03 | 0.504936E−03 | −0.657574E−03 | 0.716095E−04 |
| 7(R6) | −4.320744 | −0.814544E−02 | −0.177486E−02 | 0.246353E−02 | −0.378555E−03 | 0.360668E−04 |
| 8(R7) | −3006.0608 | −0.313430E−01 | 0.768252E−02 | −0.638911E−03 | 0.198217E−04 | 0.177158E−06 |
| 9(R8) | −14.736676 | −0.325749E−01 | 0.463409E−02 | −0.543938E−03 | 0.288680E−03 | 0.146074E−06 |

Embodiment 10

The optical imaging system 100 according to the tenth embodiment includes a first lens group G1 having a positive refractive power, a second lens group G2 having a negative refractive power, a third lens group G3 having a positive or negative refractive power, a fourth lens group G4 having a positive or negative refractive power, a stop, and a thin film filter or an optical filter.

The first lens group G1 includes a first lens L1. The second and third surfaces R1 and R2 of the first lens are aspheric. Referring to Table 2, the thickness of the first lens L1 is 1.040923 mm. The first lens L1 is separated from the stop by 0.112233 mm. The first lens L1 is formed of a material having a refractive index of 1.529960 and a [distribution value] *dispersion constant* of 55.8.

The second lens group G2 includes a second lens L2 having a refractive index of 1.75520 and a [distribution value] *dispersion constant* of 27.5305. The fourth and fifth surfaces R3 and R4 of the second lens L2 are spherical. Referring to Table 2, the center portion of the second lens L2 makes contact with the center of the first lens L1, and the thickness thereof is 0.6 mm.

The third lens group G3 includes a third lens L3. The third lens L3 includes sixth and seventh surfaces R5 and R6 which are aspheric. The third lens L3 is separated from the second lens L2 by 0.75876 mm, and has a thickness of 0.8 mm. The third lens L3 is formed of a material having a refractive index of 1.529960 and a [distribution value] *dispersion constant* of 55.8.

The fourth lens group G4 includes a fourth lens L4. The fourth lens L4 includes eighth and ninth surfaces R7 and R8 which are aspheric. The fourth lens L4 is formed of a material having a refractive index of 1.529960 and a [distribution value] *dispersion constant* of 55.8. The thin film filter or the optical filter LP is formed on one surface of a BSC7-HOYA substrate by optical thin film deposition, and outputs partially restricted light through the fourth lens L4. The thin film filter or the optical filter LP is separated from the fourth lens L4 by 0.6 mm.

The aspheric specifications of the first, third, and fourth lenses according to the tenth embodiment can be calculated as shown in Table 3 according to formula (9).

TABLE 13

| | K | A | B | C | D | E |
|---|---|---|---|---|---|---|
| 2(R1) | −0.243705 | −0.472572E−02 | 0.208724E−01 | −0.465959E−01 | 0.472830E−01 | −0.179069E−01 |
| 3(R2) | −35.906408 | −0.733648E−03 | 0.135638E−02 | −0.206406E−03 | −0.275201E−03 | −0.584975E−04 |
| 4(R3) | | | | | | |
| 5(R4) | | | | | | |
| 6(R5) | −15.792759 | −0.660694E−01 | 0.201054E−01 | 0.975285E−02 | −0.440095E−02 | 0.84255E−03 |
| 7(R6) | −2.490058 | −0.354334E−01 | −0.109024E−01 | 0.185847E−01 | −0.460071E−02 | 0.887947E−03 |
| 8(R7) | −17.989764 | −0.827253E−01 | 0.309534E−01 | −0.550268E−02 | 0.881897E−04 | 0.596575E−04 |
| 9(R8) | −5.078902 | −0.565618E−01 | 0.183829E−01 | −0.389874E−02 | 0.438295E−03 | −0.216645E−04 |

Embodiment 11

The optical imaging system 50 according to the eleventh embodiment includes a first lens group G1 having a positive refractive power, a second lens group G2 having a negative refractive power, a third lens group G3 having a positive or negative refractive power, a fourth lens group G4 having a positive or negative refractive power, a stop, and a thin film filter or an optical filter.

The first lens group G1 includes a first lens L1. The second and third surfaces R1 and R2 of the first lens L1 are aspheric. Referring to Table 3, the thickness of the first lens L1 is [1.4903] *0.4903* mm. The first lens L1 is separated from the stop by 0.122343 mm. The first lens L1 is formed of a material having a refractive index of 1.529960 and a [distribution value] *dispersion constant* of 55.8.

The second lens group G2 includes a second lens L2 having a refractive index of 1.75520 and a [distribution value] *dispersion constant* of 27.5305. The fourth and fifth surfaces R3 and R4 of the second lens L2 are aspheric. Referring to Table 3, the second lens L2 is separated from the first lens L1 by 2.001108 mm. The second lens has a thickness of 0.3 mm.

The third lens group G3 includes a third lens L3. The third lens L3 includes sixth and seventh surfaces R5 and R6 which are aspheric. The third lens L3 is separated from the second lens L2 by 0.672147 mm, and has a thickness of 1.123412 mm. The third lens L3 is formed of a material having a refractive index of 1.529960 and a [distribution value] *dispersion constant* of 55.8.

The fourth lens group G4 includes a fourth lens L4. The fourth lens L4 includes eighth and ninth surfaces R7 and R8 which are aspheric. The fourth lens L4 is formed of a material having a refractive index of 1.529960 and a [distribution value] *dispersion constant* of 55.8. The thin film filter or the optical filter LP is formed on one surface of a BSC7-HOYA substrate by optical thin film deposition, and outputs partially restricted light through the fourth lens L4. The thin film filter or the optical filter LP is separated from the fourth lens L4 by 0.53333 mm.

The aspheric specifications of the first, third, and fourth lenses according to the eleventh embodiment can be calculated as shown in Table 14 according to formula (9).

TABLE 14

| | K | A | B | C | D | E |
|---|---|---|---|---|---|---|
| 2(R1) | −0.325702 | −0.246211E−02 | 0.388533E−02 | −0.604015E−02 | 0.380199E−02 | −0.943180E−03 |
| 3(R2) | −41.631817 | 0.494266E−05 | 0.263179E−03 | −0.354857E−03 | −0.299644E−03 | 0.164888E−03 |
| 4(R3) | | | | | | |
| 5(R4) | | | | | | |
| 6(R5) | 42.685665 | −0.286127E−01 | 0.464775E−02 | 0.147457E−02 | −0.275325E−03 | 0.261278E−04 |
| 7(R6) | −2.322289 | −0.142459E−01 | −0.222570E−02 | 0.252860E−01 | −0.342195E−03 | 0.386791E−04 |
| 8(R7) | −5.810899 | −0.278816E−01 | 0.765382E−02 | −0.752745E−03 | 0.209383E−05 | 0.216703E−05 |
| 9(R8) | −4.064375 | −0.271353E−01 | 0.394463E−02 | −0.533443E−03 | 0.332976E−04 | −0.893693E−06 |

Embodiment 12

The optical imaging system 120 according to the twelfth embodiment includes a first lens group G1 having a positive refractive power, a second lens group G2 having a negative refractive power, a third lens group G3 having a positive or negative refractive power, a fourth lens group G4 having a positive or negative refractive power, a stop, and a thin film filter or an optical filter.

The first lens group G1 includes a first lens L1. The second and third surfaces R1 and R2 of the first lens L1 are aspheric. Referring to Table 3, the thickness of the first lens L1 is 1.219838 mm. The first lens L1 is separated from the stop by 0.172863 mm. The first lens L1 is formed of a material having a refractive index of 1.532889 and a [distribution value] *dispersion constant* of 66.0182.

The second lens group G2 includes a second lens L2 having a refractive index of 1.75520 and a [distribution value] *dispersion constant* of 27.5795. The fourth and fifth surfaces R3 and R4 of the second lens L2 are spherical. Referring to Table 3, the second lens L2 is separated from the first lens L1 by [0.0.159417] *0.159417* mm. The second lens has a thickness of 0.427352 mm.

The third lens group G3 includes a third lens L3. The third lens L3 includes sixth and seventh surfaces R5 and R6 which are aspheric. The third lens L3 is separated from the second lens L2 by 0.742239 mm, and has a thickness of 0.8 mm. The third lens L3 is formed of a material having a refractive index of 1.5296 and a [distribution value] *dispersion constant* of 55.8.

The fourth lens group G4 includes a fourth lens L4. The fourth lens L4 includes eighth and ninth surfaces R7 and R8 which are aspheric. The fourth lens L4 is formed of a material having a refractive index of 1.529960 and a [distribution value] *dispersion constant* of 55.8. The thin film filter or the optical filter LP is formed on one surface of a BSC7-HOYA substrate by optical thin film deposition, and outputs partially restricted light through the fourth lens L4. The thin film filter or the optical filter LP is separated from the fourth lens L4 by 0.7 mm.

The aspheric specifications of the first, third, and fourth lenses according to the twelfth embodiment can be calculated as shown in Table 15 according to formula (9).

TABLE 15

| | K | A | B | C | D | E |
|---|---|---|---|---|---|---|
| 2(R1) | −0.293313 | −0.542927E−02 | 0.212559E−01 | −0.461572E−01 | 0.474595E−01 | −0.180297E−01 |
| 3(R2) | −35.036564 | 0.831924E−03 | 0.133528E−02 | 0.317237E−03 | 0.719662E−05 | 0.460349E−05 |
| 4(R3) | | | | | | |
| 5(R4) | | | | | | |
| 6(R5) | −15.407195 | −0.672666E−1 | 0.193978E−01 | 0.951188E−02 | −0.442031E−02 | 0.886980E−03 |
| 7(R6) | −2.475560 | −0.356856E−01 | −0.108935E−01 | 0.186240E−01 | −0.459365E−02 | 0.878806E−03 |
| 8(R7) | −14.369332 | −0.818601E−01 | 0.304820E−01 | −0.560236E−02 | 0.815708E−04 | 0.625730E−04 |
| 9(R8) | −5.062053 | −0.596198E−01 | 0.176196E−01 | −0.390136E−02 | 0.437454E−03 | −0.222993E−04 |

Embodiment 13

The optical imaging system 130 according to the thirteenth embodiment includes a first lens group G1 having a positive refractive power, a second lens group G2 having a negative refractive power, a third lens group G3 having a positive or negative refractive power, a fourth lens group G4 having a positive or negative refractive power, a stop, and a thin film filter or an optical filter.

The first lens group G1 includes a first lens L1. The second and third surfaces R1 and R2 of the first lens L1 are aspheric. Referring to Table 1, the thickness of the first lens L1 is 0.812558 mm. The first lens L1 is separated from the stop by 0.03 mm. The first lens L1 is formed of a material having a refractive index of 1.602778 and a [distribution value] *dispersion constant* of 61.2648.

The second lens group G2 includes a second lens L2 having a refractive index of 1.742011 and a [distribution value] *dispersion constant* of 28.1334. The fourth and fifth surfaces R3 and R4 of the second lens L2 are spherical. Referring to Table 3, the second lens L2 is separated from the first lens L1 by 0.1 mm. The second lens L2 has a thickness of 0.3 mm.

The third lens group G3 includes a third lens L3. The third lens L3 includes sixth and seventh surfaces R5 and R6 which are aspheric. The third lens L3 is separated from the second lens L2 by 0.556157 mm, and has a thickness of 0.8 mm. The third lens L3 is formed of a material having a refractive index of 1.743972 and a [distribution value] *dispersion constant* of 44.8504.

The fourth lens group G4 includes a fourth lens L4. The fourth lens L4 includes eighth and ninth surfaces R7 and R8 which are aspheric. The fourth lens L4 is formed of a material having a refractive index of 1.719343 and a [distribution value] *dispersion constant* of 29.1913. The thin film filter or the optical filter LP is formed on one surface of a BSC7-HOYA substrate by optical thin film deposition, and outputs partially restricted light through the fourth lens L4. The thin film filter or the optical filter LP is separated from the fourth lens L4 by 0.4 mm.

The aspheric specifications of the first, third, and fourth lenses according to the thirteenth embodiment can be calculated as shown in Table 16 according to formula (9).

TABLE 16

| | K | A | B | C | D | E |
|---|---|---|---|---|---|---|
| 2(R1) | −3.105139 | −0.765718E−02 | −0.232543E−02 | −0.548132E−02 | 0.355043E−02 | −0.164865E−02 |
| 3(R2) | 6.643484 | −0.111248E−01 | −0.189739E−02 | −0.663328E−03 | −0.291696E−03 | 0.148068E−04 |
| 4(R3) | | | | | | |
| 5(R4) | | | | | | |
| 6(R5) | −61.837170 | −0.307620E−01 | −0.299148E−03 | 0.881036E−04 | −0.555307E−03 | 0.287414E−03 |
| 7(R6) | −1.252353 | −0.165700E−01 | −0.2082050E−02 | 0.832299E−03 | −0.505810E−03 | 0.104507E−03 |
| 8(R7) | −4.091718 | −0.559991E−01 | 0.354141E−02 | −0.447725E−04 | 0.906043E−04 | −0.235729E−04 |
| 9(R8) | −4.478957 | −0.316105E−01 | 0.411904E−02 | −0.364491E−03 | 0.274454E−04 | −0.207865E−05 |

Embodiment 14

The optical imaging system 140 according to the fourteenth embodiment includes a first lens group G1 having a positive refractive power, a second lens group G2 having a negative refractive power, a third lens group G3 having a positive or negative refractive power, a fourth lens group G4 having a positive or negative refractive power, a stop, and a thin film filter or an optical filter.

The first lens group G1 includes a first lens L1. The second and third surfaces R1 and R2 of the first lens L1 are aspheric. Referring to Table 3, the thickness of the first lens L1 is 1.1 mm. The first lens L1 is separated from the stop by 0.480264 mm. The first lens L1 is formed of a material having a refractive index of 1.529960 and a [distribution value] *dispersion constant* of 55.8.

The second lens group G2 includes a second lens L2 having a refractive index of 1.75520 and a [distribution value] *dispersion constant* of 27.5795. The fourth and fifth surfaces R3 and R4 of the second lens L2 are spherical. Referring to Table 3, the second lens L2 is separated from the first lens L1 by 0.1 mm. The second lens has a thickness of [0.1] *0.5* mm.

The third lens group G3 includes a third lens L3. The third lens L3 includes sixth and seventh surfaces R5 and R6 which are aspheric. The third lens L3 is separated from the second lens L2 by 2.235814 mm, and has a thickness of [0.5] *0.54408* mm. The third lens L3 is formed of a material having a refractive index of 1.675133 and a [distribution value] *dispersion constant* of 40.8062.

The fourth lens group G4 includes a fourth lens L4. The fourth lens L4 includes eighth and ninth surfaces R7 and R8 which are aspheric. The fourth lens L4 is formed of a material having a refractive index of 1.529960 and a [distribution value] *dispersion constant* of 55.8. The thin film filter or the optical filter LP is formed on one surface of a BSC7-HOYA substrate by optical thin film deposition, and outputs partially restricted light through the fourth lens L4. The thin film filter or the optical filter LP is separated from the fourth lens L4 by 0.63848 mm.

The aspheric specifications of the first, third, and fourth lenses according to the fourteenth embodiment can be calculated as shown in Table 17 according to formula (9).

TABLE 17

| | K | A | B | C | D | E |
|---|---|---|---|---|---|---|
| 2(R1) | −0.609678 | −0.33651E−02 | 0.103994E−01 | −0.531487E−02 | 0.265399E−02 | −0.110303E−02 |
| 3(R2) | −2.046651 | −0.118551E−01 | −0.268572E−02 | −0.121156E−02 | 0.310607E−03 | −0.261769E−03 |
| 4(R3) | −0.023479 | −0.621511E−05 | 0.506488E−03 | 0.302229E−03 | 0.613363E−04 | 0.105352E−03 |
| 5(R4) | −20.447531 | 0.207610E−03 | 0.4772207E−03 | 0.199399E−03 | 0.764266E−04 | −0.296394E−04 |
| 6(R5) | −28.099749 | −0.345382E−01 | 0.291077E−02 | 0.117431E−02 | −0.344832E−03 | 0.114845E−05 |
| 7(R6) | −2.937952 | −0.914876E−02 | −0.914771E−03 | 0.232561E−02 | −0.431406E−03 | 0.285117E−04 |
| 8(R7) | −7.164502 | −0.397733E−01 | 0.765148E−02 | −0.688572E−03 | 0.363819E−05 | 0.182078E−05 |
| 9(R8) | −3.704332 | −0.236715E−01 | 0.386753E−02 | −0.536289E−03 | 0.341922E−04 | −0.149054E−05 |

In sum, the optical imaging system of the present invention reduces the volume and minimizes the deterioration of the optical characteristics, such as flares, with a high resolution.

While the invention has been shown and described with reference to certain preferred embodiments thereof, it will be understood by those skilled in the art that various changes in form and details may be made therein without departing from the spirit and scope of the invention as defined by the appended claims.

What is claimed is:

[1. An optical imaging system comprising an image sensor for photoelectric conversion, the optical imaging system further comprising:

a first lens group having a positive refractive power closest to a subject;

a second lens group closest to the first lens group and having a negative refractive power;

a third lens group having one of a positive or negative power; and a fourth lens group having one of a positive or negative power, wherein each of the first to fourth lens groups comprises an aspheric lens having at least one aspheric surface thereof; and one of a thin film filter or an optical filter for restricting the transmission of a portion of light between the second and third lens groups or between the third and fourth lens groups.]

[2. An optical imaging system according to claim 1, wherein the first lens group comprises at least one lens of a positive refractive power.]

[3. An optical imaging system according to claim 1, wherein the second lens group comprises at least one lens of a negative refractive power.]

[4. An optical imaging system according to claim 1, wherein the third lens group comprises at least one lens of a positive or negative refractive power.]

[5. An optical imaging system according to claim 1, wherein a fourth lens group comprises at least one lens of a positive or negative refractive power.]

[6. An optical imaging system according to claim 1, wherein the optical imaging system satisfies $$0.3 < \frac{f_1}{f} < 3.1,$$

wherein f denotes synthetic focus distance of the optical imaging system and $f_1$ denotes focus distance of the first lens group.]

[7. An optical imaging system according to claim 1, wherein the optical imaging system satisfies $$0.3 < \frac{|f_2|}{f} < 8.99,$$

wherein f denotes a synthetic focus distance of the optical imaging system and $f_2$ denotes a focus distance of the second lens group.]

[8. An optical imaging system according to claim 1, wherein the optical imaging system satisfies $$0.19 < \frac{|f_3|}{f} < \infty,$$

wherein f denotes a synthetic focus distance of the optical imaging system and $f_3$ denotes a focus distance of the third lens group.]

[9. An optical imaging system according to claim 1, wherein the optical imaging system satisfies $$0.15 < \frac{|f_4|}{f} < \infty,$$

wherein f denotes a synthetic focus distance of the optical imaging system and $f_4$ denotes a focus distance of the second lens group.]

[10. An optical imaging system comprising an image sensor for photoelectric conversion, the optical imaging system further comprising:

a first lens group having a positive refractive power;

a second lens group having a negative refractive power;

a third lens group having one of a positive or negative power; and a fourth lens group having one of a positive or negative power, wherein the optical imaging system satisfies $$0.45 < \frac{f}{TTL} < 1.01,$$

wherein f denotes a synthetic focus distance of die optical imaging system and TTL denotes a distance from an iris surface to an imaging surface;

wherein a lens located in the first lens group and having at least one aspheric surface; and one of a thin film filter or an optical filter for restricting the transmission of a portion of light between the second and third lens groups or between the third and fourth lens groups.]

[11. An optical imaging system according to claim 10, further comprising a parallel flat glass disposed between the image sensor and the fourth lens group.]

[12. An optical imaging system comprising an image sensor for photoelectric conversion, the optical imaging system further comprising:

a first lens group having a positive refractive power;

a second lens group having a negative refractive power;

a third lens group having one of a positive or negative power; and a fourth lens group having one of a positive or negative power, wherein the first and second lens groups satisfy an optical axis direction size according to $$0 < \frac{d_1}{TTL} < 0.26,$$

wherein $d_1$ denotes a separated distance between the first lens group and the second lens group on the optical axis and TTL denotes a distance from an iris surface to an imaging surface;

wherein a lens located in the first lens group and having at least one aspheric surface; and one of a thin film filter or an optical filter for restricting the transmission of a portion of light between the second and third lens groups or between the third and fourth lens groups.]

[13. An optical imaging system according to claim 12, further comprising a parallel flat glass disposed between the image sensor and the fourth lens group.]

[14. An optical imaging system comprising an image sensor for photoelectric conversion, the optical imaging system further comprising:

a first lens group having a positive refractive power;

a second lens group having a negative refractive power;

a third lens group having one of a positive or negative power; and a fourth lens group having one of a positive or negative power, wherein the third and fourth lens groups satisfy an optical axis direction size according to $$0 < \frac{d_3}{TTL} < 0.40,$$

wherein $d_3$ denotes a separated distance between the third lens group and the fourth lens group on the optical axis and TIL denotes a distance from an iris surface to an imaging surface;

wherein a lens located in the first lens group and having at least one aspheric surface; and one of a thin film filter or an optical filter for restricting the transmission of a portion of light between the second and third lens groups or between the third and fourth lens groups.]

[15. An optical imaging system according to claim 14, further comprising a parallel flat glass disposed between the image sensor and the fourth lens group.]

[16. An optical imaging system comprising an image sensor for photoelectric conversion, the optical imaging system further comprising:

a first lens group having a positive refractive power closest to a subject;

a second lens group closest to the first lens group and having a negative refractive power;

a third lens group having one of a positive or negative power; and a fourth lens group having one of a positive or negative power, wherein each of the first to fourth lens groups comprises an aspheric lens having at least one aspheric surface thereof, and wherein the Abbe's numbers of the first and second lens groups G1 and G2 satisfy $$28.2 < \upsilon 1 - \upsilon 2 < 42.8,$$

wherein $\upsilon_1$ and $\upsilon_2$ denote Abbe's numbers representing the distribution characteristics of the first and second lens groups respectively.]

*17. An optical imaging system for pickup comprising, in order from object side to image side:*

*a first lens with a positive refractive power having an object side surface with a positive curvature;*

*a second lens with a negative refractive power having an object side surface with a negative curvature and an image side surface with a positive curvature;*

*a third lens with a refractive power having an object side surface with negative curvature and an image side surface with negative curvature; and*

*a fourth lens with a negative refractive power;*

*wherein each of the first lens, the second lens, the third lens, the fourth lens is an aspheric lens having at least one aspheric surface thereof,*

*wherein an Abbe number of the first lens is v1, an Abbe number of the second lens is v2, and the following condition is satisfied:*

$$28.2<v1-v2<42.8.$$

*18. The optical imaging system of claim 17, wherein the first lens comprises an image side surface with a negative or positive curvature.*

*19. The optical imaging system of claim 17, wherein the first lens and the second lens contact each other.*

*20. The optical imaging system of claim 17, wherein the third lens is a lens with a positive refractive power.*

*21. The optical imaging system of claim 17, wherein an object side surface and an image side surface of the fourth lens are aspheric.*

*22. The optical imaging system of claim 17, wherein the fourth lens comprises an object side surface with a negative curvature and an image side surface with a positive curvature.*

*23. The optical imaging system of claim 22, wherein a sign of the curvature of at least one of the object side surface or the image side surface of the fourth lens is changed from an optical axis towards an edge of the fourth lens.*

*24. The optical imaging system of claim 17, wherein the optical imaging system satisfies the following equation:*

$$0.45<f/TTL<1.01,$$

*wherein f denotes a total focal length of the optical imaging system and TTL denotes a distance from an iris to an imaging surface.*

*25. The optical imaging system of claim 17, wherein the optical imaging system satisfies the following equations:*

$$0.3<f1/f<3.1$$

$$0.3<|f2|/f<8.99,$$

*wherein f denotes a total focal length of the optical imaging system, f1 denotes a focal length of the first lens, and f2 denotes a focal length of the second lens.*

*26. The optical imaging system of claim 17, wherein the optical imaging system satisfies the following equations:*

$$0.19<|f3|/f<\infty$$

$$0.15<|f4|/f<\infty,$$

*wherein f denotes a total focal length of the optical imaging system, f3 denotes a focal length of the third lens, and f4 denotes a focal length of the fourth lens.*

*27. The optical imaging system of claim 17, wherein an iris is disposed at an object side of the first lens.*

*28. The optical imaging system of claim 17, wherein the optical imaging system satisfies the following equation:*

$$0<d1/TTL<0.26,$$

*wherein d1 denotes a separated distance between the first lens and the second lens on the optical axis and TTL denotes a distance from an iris to an imaging surface.*

*29. The optical imaging system of claim 17, wherein the optical imaging system satisfies the following equation:*

$$0<d3/TTL<0.40,$$

*wherein d3 denotes a separated distance between the third lens and the fourth lens on the optical axis and TTL denotes a distance from an iris to an imaging surface.*

*30. An optical imaging system for pickup comprising, in order from object side to image side:*

*a first lens with a positive refractive power;*

*a second lens with a negative refractive power having an object side surface with a negative curvature and an image side surface with a positive curvature;*

*a third lens with a refractive power; and*

*a fourth lens with a negative refractive power;*

*wherein each of the first lens, the second lens, the third lens, the fourth lens is an aspheric lens having at least one aspheric surface thereof,*

*wherein an Abbe number of the first lens is v1, an Abbe number of the second lens is v2, and the following condition is satisfied:*

$$28.2<v1-v2<42.8.$$

*31. The optical imaging system of claim 30, wherein the first lens comprises an object side surface with a positive curvature and an image side surface with a negative curvature.*

*32. The optical imaging system of claim 30, wherein the third lens is a lens with a positive refractive power.*

*33. The optical imaging system of claim 30, wherein the third lens comprises an object side surface with a negative curvature and an image side surface with a negative curvature.*

*34. The optical imaging system of claim 30, wherein the fourth lens comprises an object side surface with a negative curvature and an image side surface with a positive curvature.*

*35. The optical imaging system of claim 34, wherein a sign of the curvature of at least one of the object side surface or the image side surface of the fourth lens is changed from an optical axis towards an edge of the fourth lens.*

*36. The optical imaging system of claim 30, wherein an object side surface and an image side surface of the fourth lens are aspheric.*

* * * * *